(12) United States Patent
Mak et al.

(10) Patent No.: US 12,361,242 B2
(45) Date of Patent: Jul. 15, 2025

(54) HYBRID FIXED FOCUS ENGINE USING AN AUTO-FOCUS ENGINE WITH RANGING

(71) Applicant: ZEBRA TECHNOLOGIES CORPORATION, Lincolnshire, IL (US)

(72) Inventors: Jason S. Mak, Commack, NY (US); Carl D. Wittenberg, Water Mill, NY (US); Maulin Sheth, Central Islip, NY (US); Eric Park, Mississauga (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/385,761

(22) Filed: Oct. 31, 2023

(65) Prior Publication Data

US 2025/0139393 A1 May 1, 2025

(51) Int. Cl.
*G06K 7/10* (2006.01)
*G06K 7/14* (2006.01)

(52) U.S. Cl.
CPC ....... *G06K 7/10881* (2013.01); *G06K 7/1413* (2013.01); *G06K 2007/10524* (2013.01)

(58) Field of Classification Search
CPC ............. G06K 7/10881; G06K 7/1413; G06K 2007/10524
See application file for complete search history.

(56) References Cited

U.S. PATENT DOCUMENTS 11,438,518 B1 * 9/2022 Barish .................... H04N 23/67

FOREIGN PATENT DOCUMENTS

| EP | 0745951 A2 | 12/1996 |
| GB | 2610475 A | 3/2023 |
| WO | 9603708 A1 | 2/1996 |

OTHER PUBLICATIONS

International Search Report and Written Opinion for International Patent Application No. PCT/US2024/053971 mailed on Jan. 8, 2025.

* cited by examiner

*Primary Examiner* — Matthew Mikels
(74) *Attorney, Agent, or Firm* — Yuri Astvatsaturov

(57) ABSTRACT

Devices, systems, and methods for providing a hybrid fixed focus during operation of an indicia reader. An example system includes at least one imaging assembly; controller; and one or more processors configured to (a) initiate a ranging operation; (b) determine a range value associated with a distance between the imaging assembly and an object; (c) retrieve a threshold range value from memory; (d) compare the range value to the threshold range value; (e) initiate a hybrid fixed focus operation comprising: (i) energizing an illumination assembly to provide illumination; and (ii) capturing a first set of images at a fixed focus position corresponding to the range value responsive to the range value not exceeding the threshold range value, and the fixed focus position corresponding to the threshold range value responsive to the range value exceeding the threshold value; and (f) terminate the hybrid fixed focus operation based upon a termination signal.

18 Claims, 10 Drawing Sheets

350

357

| Illumination Source | Illumination Intensity | Zone | Zone Range (Inches) | | Range Value |
|---|---|---|---|---|---|
| | % | # | Min. | Max. | |
| Near Field LED | 10 | 15 | 0.0 | 10.0 | 10 |
| | 20 | 14 | 10.1 | 20.0 | 20 |
| | 30 | 13 | 20.1 | 30.0 | 30 |
| | 40 | 12 | 30.1 | 40.0 | 40 |
| | 50 | 11 | 40.1 | 50.0 | 50 |
| | 60 | 10 | 50.1 | 60.0 | 60 |
| | 70 | 9 | 60.1 | 70 | 70 |
| | 80 | 8 | 70.1 | 80.0 | 80 |
| | 90 | 7 | 80.1 | 90.0 | 90 |
| | 100 | 6 | 90.1 | 100.0 | 100 |
| Far Field LED | 20 | 5 | 100.1 | 110.0 | 110 |
| | 40 | 4 | 110.1 | 120.0 | 120 |
| | 60 | 3 | 120.1 | 130.0 | 130 |
| | 80 | 2 | 130.1 | 140.0 | 140 |
| | 100 | 1 | 140.1 | 150.0 | 150 |
| | 100 | 0 | 150.1 | Infinite | 160 |

HYBRID FIXED FOCUS ENGINE USING AN AUTO-FOCUS ENGINE WITH RANGING

BACKGROUND

Barcode reading systems, such as a handheld indicia reader, may conduct a ranging operation when projecting an aiming light onto the surface of an object to determine the distance between the barcode reading system and the object an its barcode, e.g., when purchasing an item during checkout. The distance information may be used to capture in-focus images of the barcode for subsequent barcode identification and decoding. However, in some situations, the distance determined by the ranging operation may be misrepresentative of the actual distance between the barcode reading system and the object. For example, if the object is made of glass, contains apertures on its surface (e.g., a milk crate), or is suspended in the air, these situations or other similar scenarios may result in the aiming light reflecting off of a surface other than the object during the ranging operation. This may cause the barcode reading system to determine incorrect distance information associated with the object, and capture images of the barcode which are out-of-focus, leading to an unsuccessful identification and/or decode of the barcode. As a result, the barcode reading system may initiate one or more successive ranging operations, image capture operations, and/or cause the user to re-scan the object in an attempt to obtain an in-focus image of the barcode, and in the process waste time, energy, and cause frustration for the user. As such, systems and methods which can reduce or eliminate the deleterious effects of ranging operations which provide inaccurate distance information causing an unsuccessful decode of a barcode would increase checkout times, reduce power and resource consumption, and improve the user experience.

SUMMARY

In an embodiment, a method for providing a hybrid fixed focus during operation of an indicia reader. The method includes: (a) initiating a ranging operation of an imaging assembly having a field of view; (b) based upon the ranging operation, determining a range value associated with a distance between the imaging assembly and an object in the field of view; (c) retrieving a threshold range value locally from a memory associated with the imaging assembly; (d) comparing the range value to the threshold range value; (e) initiating a hybrid fixed focus operation via a controller, the hybrid fixed focus operation comprising: (i) energizing an illumination assembly to provide illumination of the field of view during the hybrid fixed focus operation; and (ii) capturing, by the imaging assembly, a first set of one or more images comprising image data of an environment appearing in the field of view at a fixed focus position, wherein the fixed focus position corresponds to the range value responsive to the range value not exceeding the threshold range value, and wherein the fixed focus position corresponds to the threshold range value responsive to the range value exceeding the threshold value; and (f) terminating the hybrid fixed focus operation based upon the controller receiving a termination signal.

In a variation of the embodiment, the method further includes: responsive to not receiving the termination signal, wherein the termination signal is based upon a successful decode of an indicia contained within at least one image of the first set of images captured during the hybrid fixed focus operation, initiating the ranging operation to determine an updated range value; and initiating a bracketing operation via the controller, the bracketing operation comprising: capturing, by the imaging assembly, a second set of multiple images comprising image data of the environment appearing in the field of view at a bracketed set of focus positions around the fixed focus position corresponding to the updated range value; and energizing the illumination assembly to an illumination intensity determined based upon the updated range value.

In yet another variation of the embodiment, the method further includes: responsive to not receiving the termination signal, wherein the termination signal is based upon the successful decode of the indicia contained within at least one image of the second set of multiple images captured during the bracketing operation, initiating a ramping operation via the controller, the ramping operation comprising: capturing, by the imaging assembly, a plurality of images comprising image data of the environment appearing in the field of view using an associated plurality of focus parameters defining a plurality of different focal zones, the ramping operation generating image data at each focal zone of the plurality of focal zones; and energizing the illumination assembly to an illumination intensity determined based upon the each focal zone of the plurality of focal zones.

In still yet another variation of the embodiment, the ranging operation further includes: energizing an aiming light source configured to project an aiming light into the field of view; capturing, by the imaging assembly, one or more images comprising image data of the field of view containing the aiming light; analyzing a position of the aiming light in the one or more images to determine the range value; and storing the range value locally on a memory associated with the imaging assembly.

In a variation of the embodiment, the ranging operation further includes retrieving a last known range value locally from the memory associated with the imaging assembly.

In yet another variation of the embodiment, the illumination assembly includes at least one near field illumination assembly and at least one far field illumination assembly.

In still yet another variation of the embodiment, energizing the illumination assembly during the hybrid fixed focus operation includes energizing the near field illumination assembly.

In a variation of the embodiment, the illumination assembly includes at least one near field illumination assembly and at least one far field illumination assembly; the plurality of focus parameters comprise focus parameters defining a first plurality of focal zones corresponding to at least one near field illumination assembly and a second plurality of focal zones corresponding to the at least one far field illumination assembly; and the ramping operation further comprises generating, by the imaging assembly, image data at each of the plurality of focal zones and/or at each of the second plurality of focal zones.

In yet another variation of the embodiment, terminating the hybrid fixed focus operation based upon the controller receiving the termination signal further includes: providing the image data from at least one image of the first set of one or more images to a decoding module; analyzing the image data from the at least one image of the one or more images by the decoding module to decode an indicia contained within the at least one image; and responsive to decoding the indicia contained within the at least one image, receiving the termination signal.

In still yet another variation of the embodiment, wherein the threshold range value is at least one of provided by a user, generated by a machine learning model, or based upon historical range values for the object in the field of view.

In another embodiment, a system for providing a hybrid fixed focus during operation of an indicia reader. The system includes an imaging assembly having a field of view; a controller; one or more processors; and a memory associated with the indicia reader scanner storing instructions that, when executed by the one or more processors, cause the one or more processors to: (a) initiate a ranging operation of the imaging assembly; (b) based upon the ranging operation, determine a range value associated with a distance between the imaging assembly and an object in the field of view; (c) retrieve a threshold range value locally from a memory associated with the imaging assembly; (d) compare the range value to the threshold range value; (e) initiate a hybrid fixed focus operation via the controller, wherein the hybrid fixed focus operation comprises the one or more processors configured to: (i) energize an illumination assembly to provide illumination of the field of view during the hybrid fixed focus operation; and (ii) capture, by the imaging assembly, a first set of one or more images comprising image data of an environment appearing in the field of view at a fixed focus position, wherein the fixed focus position corresponds to the range value responsive to the range value not exceeding the threshold range value, and wherein the fixed focus position corresponds to the threshold range value responsive to the range value exceeding the threshold value; and (f) terminate the hybrid fixed focus operation based upon the controller receiving a termination signal.

In yet another embodiment, a tangible machine-readable medium including instructions that, when executed, cause a machine to at least: (a) initiate a ranging operation of an imaging assembly having a field of view; (b) based upon the ranging operation, determine a range value associated with a distance between the imaging assembly and an object in the field of view; (c) retrieve a threshold range value locally from a memory associated with the imaging assembly; (d) compare the range value to the threshold range value; (e) initiate a hybrid fixed focus operation via a controller, wherein the hybrid fixed focus operation further comprises instructions that, when executed, cause the machine to: (i) energize an illumination assembly to provide illumination of the field of view during the hybrid fixed focus operation; and (ii) capture a first set of one or more images comprising image data of an environment appearing in the field of view at a fixed focus position by the imaging assembly, wherein the fixed focus position corresponds to the range value responsive to the range value not exceeding the threshold range value, and wherein the fixed focus position corresponds to the threshold range value responsive to the range value exceeding the threshold value; and (f) terminate the hybrid fixed focus operation based upon the controller receiving a termination signal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3C illustrates an example look-up table for determining focus parameters and illumination parameters of an example imaging device, such as the example imaging device of FIG. 2;

Figure 1:
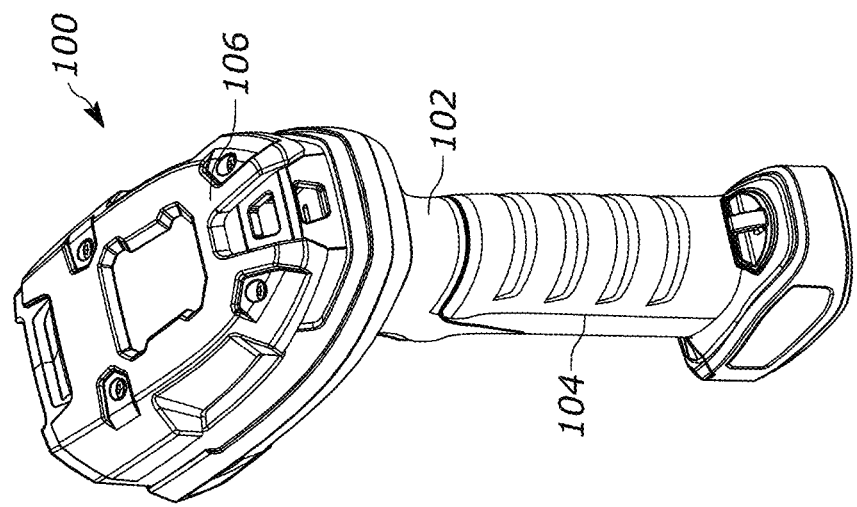
FIG. 1 illustrates a perspective front and back view of an example scanner in accordance with various embodiments.
Figure 1:
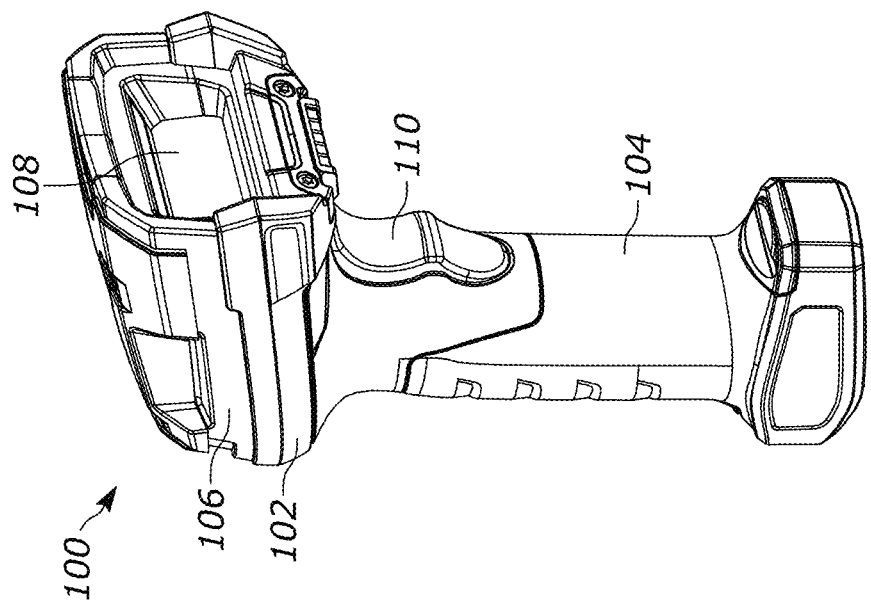

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, a ranging operation which results in a distance to an object which is misrepresentative of the object's actual distance may waste time, energy and resources of the imaging system and/or user. Therefore, it is an objective of the present disclosure to provide systems and methods capable of providing a hybrid fixed focus during operation of an indicia reader. As a result, the indicia reader may ignore distance values provided by a ranging operation which are beyond a threshold value, allowing the indicia reader to more quickly decode barcodes, reducing time at checkout, and thus providing the user with a more efficient and enjoyable checkout experience.

Additionally, it should be understood that the indicia and indicia scanning/decoding methods are referenced herein primarily as a barcode and barcode scanning/decoding for the purposes of discussion only. The systems and methods of the present disclosure may apply to any indicia (e.g., barcodes, quick response (QR) codes, a graphic, a logo, etc.) associated with an object.

Turning to the Figures, FIG. 1 illustrates an example indicia reader 100 having a housing 102 with a handle portion 104 and a head portion 106. The head portion 106 includes a window 108 and is configured to be positioned on the top of the handle portion 104. The head portion 106 includes an imaging lens (e.g., imaging lens 244 as described with respect to FIG. 2 below) that, depending on the implementation, is and/or includes a variable focus optical element.

The handle portion 104 is configured to be gripped by a reader user (not shown) and includes a trigger 110 for activation by the user. Optionally included in an embodiment is a base portion (not shown), which may be attached to the handle portion 104 opposite the head portion 106 and is configured to stand on a surface and support the housing 102 in a generally upright position. The indicia reader 100 may be used in a hands-free mode as a stationary workstation when it is placed on a countertop or other workstation surface. The indicia reader 100 may also be used in a handheld mode when it is picked up off the countertop or base station and held in an operator's hand. In the hands-free mode, products may be slid, swiped past, or presented to the window 108 for the reader to initiate barcode reading operations. In the handheld mode, the indicia reader 100 may be moved towards a barcode on a product, and the trigger 110 may be manually depressed or engaged to initiate a ranging operation and/or otherwise imaging of the barcode.

Other implementations may provide only handheld or only hands-free configurations. In the embodiment of FIG. 1, the reader 100 is ergonomically configured for a user's hand as a gun-shaped housing 102, though other configurations may be utilized as understood by those of ordinary skill in the art. As shown, the lower handle 104 extends below and rearwardly away from the body 102 along a centroidal axis obliquely angled relative to a central FOV axis of a FOV of an imaging assembly within the scanning head 102.

Figure 2:
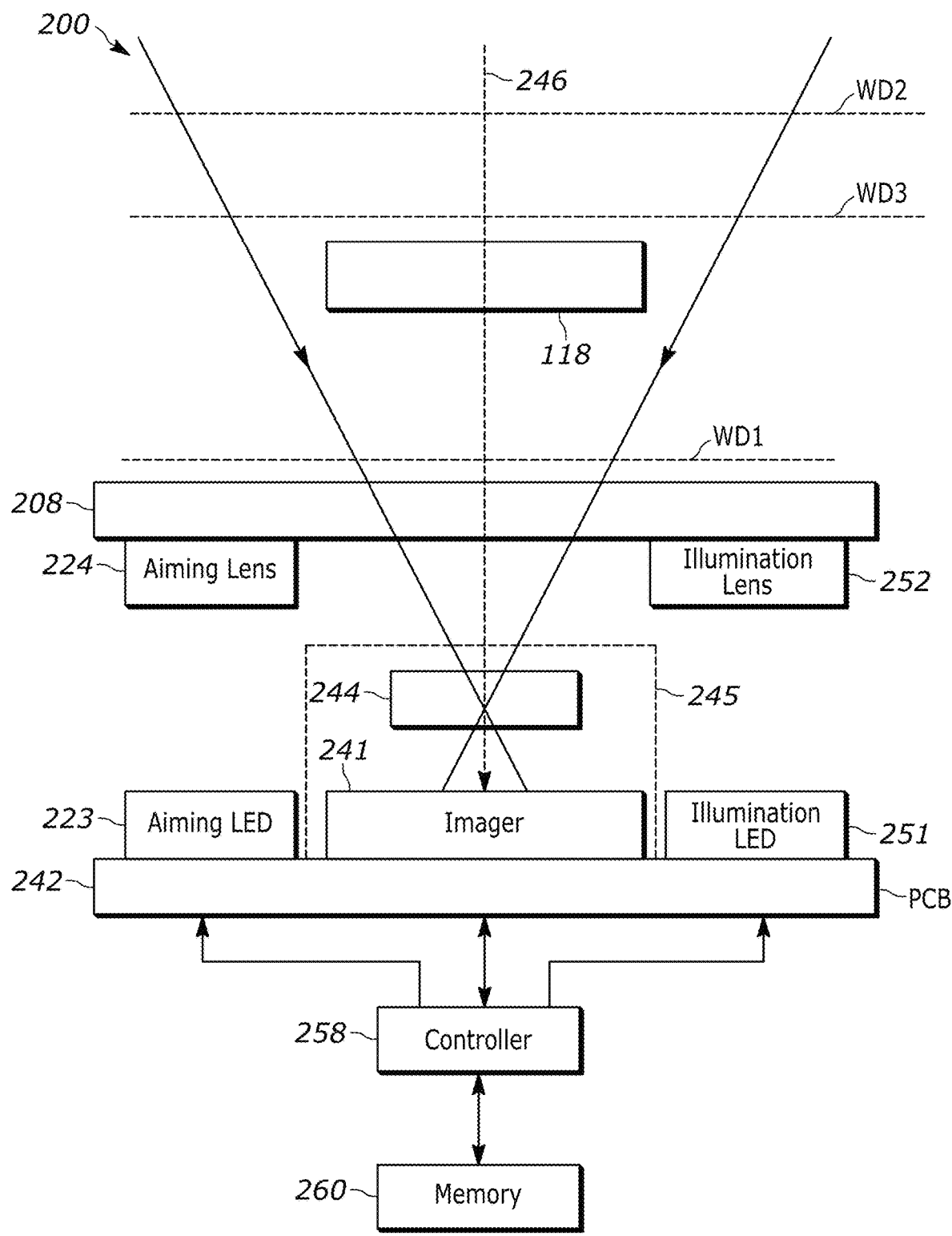
FIG. 2 illustrates a block diagram of an example imaging device such as the example scanner of FIG. 1.

Referring next to FIG. 2, a block diagram of an example architecture for an imaging device 200 such as handheld indicia reader 100 is shown. For at least some of the reader implementations, an imaging assembly 245 includes a light-detecting sensor or imager 241 operatively coupled to, or mounted on, a printed circuit board (PCB) 242 in the imaging device 200 as shown in FIG. 2. In an implementation, the imager 241 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging assembly 245 over a FOV along an imaging axis 246 through the window 208. The imager 241 may also include and/or function as a monochrome sensor and, in further implementations, a color sensor. It should be understood that the terms "imager", "image sensor", "imaging sensor", and the like are used interchangeably herein. Depending on the implementation, imager 241 may include a color sensor such as a vision camera in addition to and/or as an alternative to the monochrome sensor. In some implementations, the imager 241 is or includes a barcode reading module (e.g., a monochromatic imaging sensor). In further implementations, the imager 241 additionally or alternatively is or includes a vision camera (e.g., a color imaging sensor). It will be understood that, although imager 241 is depicted in FIG. 2 as a single block, that imager 241 may be multiple sensors spread out in different locations of imaging device 200.

The return light is scattered and/or reflected from an object 118 over the FOV. The imaging lens 244, which in at least some of the reader implementations is included in the imaging assembly 245, is operative for focusing the return light onto the array of image sensors to enable the object 118 to be imaged. In particular, the light that impinges on the pixels is sensed and the output of those pixels produce image data that is associated with the environment that appears within the FOV (which may include the object 118). This image data is typically processed by a controller 258 (usually by being sent to a decoder) which identifies and decodes decodable indicia captured in the image data. Once the decode is performed successfully, the indicia reader may signal a successful "read" of the object 118 (e.g., a barcode). The object 118 may be located anywhere in a working range of distances between a close-in working distance (WD1) and a far-out working distance (WD2). In an implementation, WD1 is about one and six-tenths (1.6) inches from the window 208, and WD2 is about thirty (30) inches from the window 208.

In some implementations, the imaging lens 244 includes a variable focus optical element. In further implementations, the variable focus optical element is a lens operated and/or adjusted by a ball-bearing motor lens or a voice coil motor (VCM) actuator (i.e., a VCM lens). In implementations in which the variable focus optical element is a ball-bearing motor or VCM lens, the ball-bearing motor or VCM lens may have a focus range from one and six-tenths (1.6) inches extending infinitely (i.e., to optical infinity), or any other suitable focus range. In further embodiments, the variable focus optical element may be any lens or optical element with a similar capability to adjust focus, such as a liquid lens, a T-lens, a ball-bearing focusing actuator and any other similar lens known in the art. Depending on the implementation, the controller 258 or other processor associated with the imaging assembly 245 may control the variable focus optical element.

An illumination assembly may also be mounted in, attached to, or associated with the imaging device 200. The illumination assembly includes an illumination light source 251, such as at least one light emitting diode (LED) or other suitable light source, and at least one illumination lens 252, and preferably a plurality of illumination light sources and illumination lenses, configured to generate a substantially uniform distributed illumination pattern of illumination light on and along the object 118 to be imaged by image capture. At least part of the scattered and/or reflected return light is derived from the illumination pattern of light on and along the object 118.

Although FIG. 2 illustrates a single illumination source 251, it will be understood that the illumination light source 251 may include more illumination sources. In at least one implementation, the illumination assembly may include at least one near field illumination assembly (e.g., at least one near field illumination source and at least one illumination lens 252) and at least one far field illumination assembly (e.g., at least one far field illumination source and at least one illumination lens 252). In at least some embodiments, the illumination light source 251 may include a near field illumination source, such as a near field LED, and a far field illumination source, such as a far field LED. In at least some implementations, the near field illumination source may be suitable for illuminating objects nearer to the imaging device 200 (e.g., when capturing an image of the object 118, which may include an indicia for decoding) as compared to the far field illumination light source which may be a suitable illumination light source for illuminating the object 118 further from the imaging device 200. The illumination sources comprising the illumination light source 251 may be separately and non-simultaneously energized, simultaneously energized, or any combination thereof.

In at least one implementation, the light sources of the illumination light source 251 may have different illumination capabilities, power levels or other illumination characteristics from one another. For example, the light sources may be different, e.g., one or more of infrared (IR), LED, organic LED (OLED), etc. In another example, the near field illumination light source may be capable of sufficiently illuminating the object 118 for imaging purposes (e.g., decoding a barcode) up to a certain distance from the imaging device 200 (e.g., in a zone between WD1 and WD3), whereas the far field illumination source may be capable of sufficiently illuminating the object 118 beyond the distance of the near field illumination LED for imaging purposes (e.g., in a zone between WD3 and WD2). In at least one implementation, the far field illumination source may provide illumination such that it may be less suitable and/or non-ideal for imaging the object 118 closer than a certain distance to the imaging device 200 (e.g., closer than WD3). For example, energizing the far field illumination source to illuminate the object 118 at certain distances may result in an over-exposure of the object 118 and/or indicia thereupon when captured in an image by the imaging device 200. Accordingly, one or more of the illumination light sources 251 may only be energized when the imaging device 200 images an object at a distance associated with certain range value for which an illumination light source 251 would be most appropriate.

For example, continuing with the above example where WD1 is one and six-tenths (1.6) inches from the window 208, and WD2 is about thirty (30) inches from the window, the near field LED may be most appropriate for illuminating objects in a zone between one and six-tenths (1.6) inches up to ten (10) inches when capturing images for decoding, and the far field LED may be most appropriate one for illuminating objects in a zone more than ten (10) inches and up to thirty (30) inches when capturing images for decoding. Illuminating the object 118 using the most appropriate illumination source 251 may provide improved exposure of the object/indicia in the captured images.

In at least one implementation, the power level of the one or more illumination light sources 251 may be variable, e.g., using one or more of a duration of an electrical pulse or variable current during a duty cycle of the source powering the illumination light source 251. In some implementations, adjusting and/or varying the power level of the illumination light source 251 may correspondingly vary the illumination intensity of the associated illumination source. For example, operating an LED at full power may provide a higher illumination intensity than operating at half power. Accordingly, to further optimize illuminating the object 118 and/or the exposure level of an image of the object 118, one or more of the light sources 251 may be energized at specific intensities when the imaging device 200 images the object 118 based upon the distance between the imaging device 200 and the object 118. In some implementations, the distance may be represented by an associated range value. Certain object distances, range values, and/or focal parameters may provide for energizing a specific illumination source at a specific illumination intensity, i.e., illumination parameters, which may further improve exposure of the object 118 and/or indicia in the captured images.

An aiming light assembly may also be mounted in, attached to, or associated with the imaging device 200 and preferably includes an aiming light source 223, e.g., one or more aiming LEDs and/or laser light sources, and an aiming lens 224 for generating and directing a visible aiming light beam away from the imaging device 200 onto the object 118 in the direction of the FOV of the imager 241.

Further, the imager 241, the illumination light source 251, and the aiming light source 223 may be operatively connected to a programmed microprocessor or controller 258 operative for controlling the operation of these components. In some implementations, the controller 258 is or includes an imaging processor as described herein. In further implementations, the controller 258 functions as, or is communicatively coupled to, an imaging processor for receiving, processing, and/or analyzing the image data captured by the imagers. For example, in one embodiment, the imaging device 200 includes an indicia decoder (e.g., such as a barcode scanner) in communication with the imager 241, and configured to receive the image data, locate and/or decode one or more indicia captured in the image data. In at least some embodiments, the indicia decoder and/or indicia decoding module may be controlled independently (e.g., via controller 258 or other suitable processor, device and/or component) from the imager 241. In at least some embodiments, the indicia decoder may be part of an indicia decoding module. In at least some embodiments, the indicia decoder and/or indicia decoding module may be part of imaging device 200 and/or imager 241, or may be a separate component which is not part of the imaging device and/or imager 241 but is in communication with, and/or operably connected to, the imaging device 200 and/or imager 241.

A memory 260 is connected and accessible to the controller 258. Preferably, the controller 258 is the same as the one used for processing the captured return light from the illuminated object 118 to obtain data related to the object 118. Although not shown, additional optical elements, such as collimators, lenses, apertures, compartment walls, etc. may be provided in the housing. Although FIG. 2 shows the imager 241, the illumination light source 251, and the aiming light source 223 as being mounted on the same PCB 242, it should be understood that different implementations of the imaging device 200 may have these components each on a separate PCB, or in different combinations on separate PCBs. For example, in an implementation of the imaging device 200, the illumination LED source 251 is provided as an off-axis illumination (i.e., has a central illumination axis that is not parallel to the central FOV axis).

In some implementations, the object 118 is, or includes, an indicia for decoding (e.g., a decode indicia), such as a barcode, a QR code, a label, a UPC code, a digital matrix code, logo, image, etc. In further implementations, the object 118 is or includes a digital watermark, the digital watermark may include a plurality of repeating barcodes, product codes, code patterns, or other such indicia that comprise the digital watermark. In some such implementations, the digital watermark is invisible or near-invisible to the human eye but is able to be detected and/or imaged by an imaging device 200.

Figure 3A:
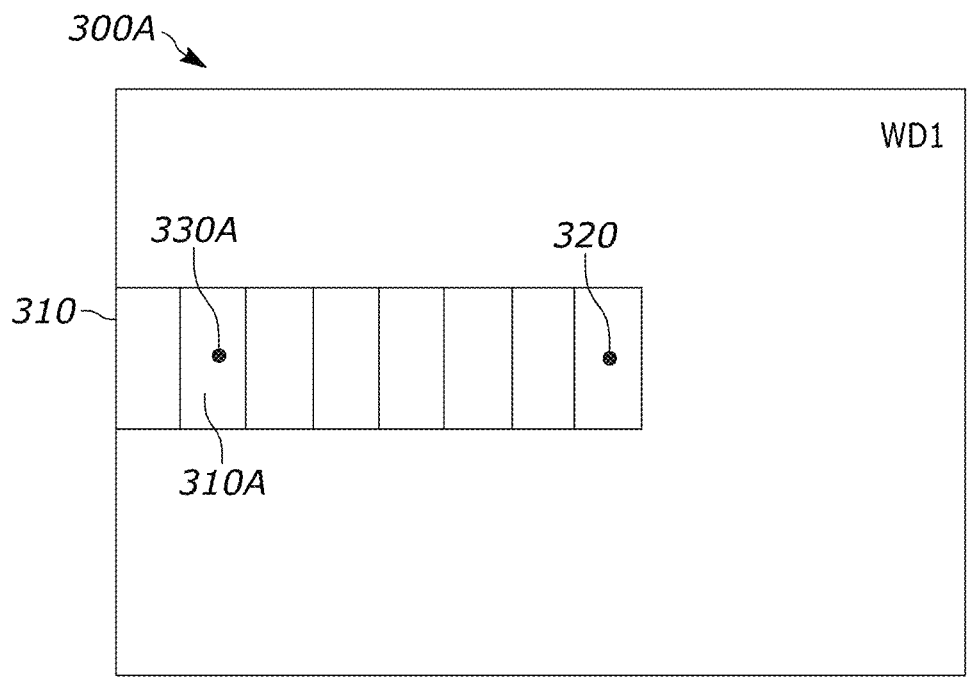
FIG. 3A illustrates an example aiming pattern on an object located at a close-in distance from an example imaging device, such as the example imaging device of FIG. 2.
Figure 3B:
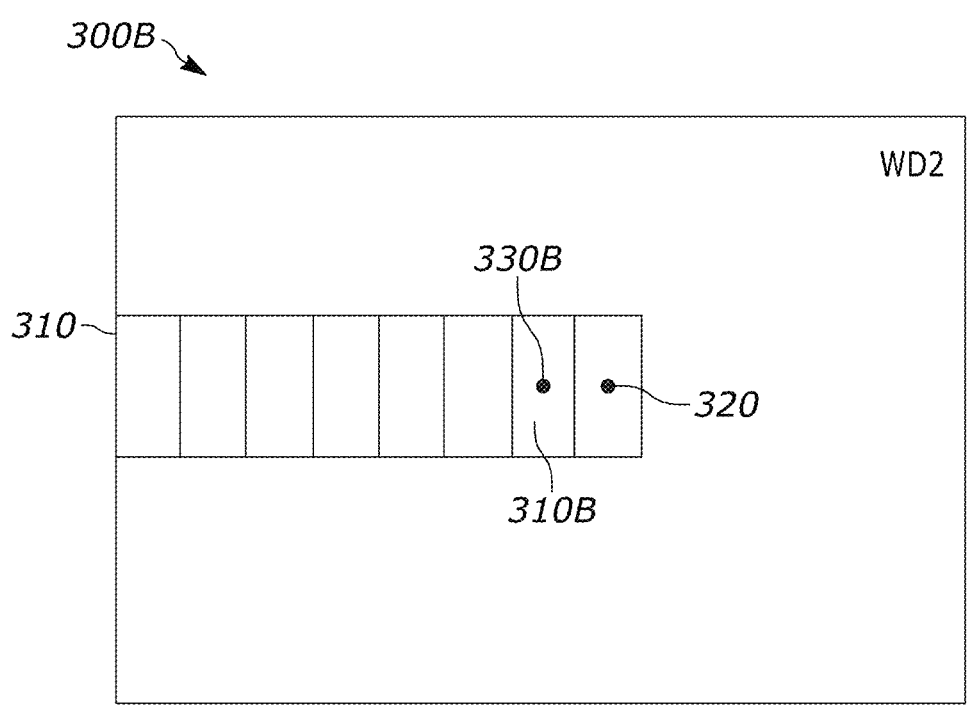
FIG. 3B illustrates an example aiming pattern on an object located at a far-out distance from an example imaging device, such as the example imaging device of FIG. 2.

FIGS. 3A and 3B illustrate aiming patterns 330A, 330B in a close-in FOV 300A at a close-in working distance WD1, and far-out FOV 300B at a far-out working distance WD2, respectively. In particular, in at least some embodiments, the imaging device 200 determines (e.g., via a controller such as controller 258 or imaging processor of imaging assembly 245) a distance between a center point 320 and an aiming pattern 330A and 330B (e.g., as projected by an aiming module such as aiming LED 223 and aiming lens 224) to determine a distance between the imaging device 200 and the object being imaged, such as object 118. The distance may be determined by a ranging operation, as further described herein.

In at least some embodiments, the FOVs 300A and 300B may be divided into an equal number of imaging regions 310. Based on which region the aiming pattern 330A and/or 330B falls into, the imaging device 200 determines a distance between the imaging device 200 and the object. In at least some embodiments, determining the distance between the center point 320 and the aiming pattern 330A and 330B is not necessary if using imaging regions 310 to determine the distance between the imaging device 200 and the object. It will be understood that, although the exemplary embodiments of FIGS. 3A and 3B depict eight imaging regions 310 of equal size, that the imaging device 200 may, depending on the embodiment, divide the FOVs 300A and 300B into four regions, sixteen regions, thirty-two regions, etc. Similarly, the imaging regions 310 may be of different shapes and/or sizes.

The distance may have an associated range value. For example, in the exemplary embodiment of FIG. 3A, the imaging device 200 determines that the aim pattern 330A is in a second region 310A (e.g., six regions away from the center 320), and subsequently determines that the object is at a distance of WD1, e.g., one and six-tenths (1.6) inches, one (1) inch, or two (2) inches, etc. from the imaging device 200, which may have a first associated range value. Similarly, in the exemplary embodiment of FIG. 3B, the imaging device 200 determines that the aim pattern 330B is in a seventh region 310B (e.g., one region away from the center 320), and subsequently determines that the object is at distance of WD2, e.g., thirty-two (32) inches, forty (40) inches, or forty-eight (48) inches, etc. form the imaging device 200, which may have a second associated range value. As such, the imaging device 200 may use parallax techniques to determine a distance and associated range value between the imaging device 200 and the object 118 to be scanned.

In some examples, the imaging device 200 is calibrated during manufacture to accommodate, possibly among other tolerances, a tolerance in the separation between the imager 241 and the aiming light source 223 and/or a tolerance in an optical alignment of the imager 241 and the aiming light source 223. Such manufacturing tolerances affect the amount of and/or the geometry of parallax between the imager 241 and the aiming light source 223. Accordingly, the imaging device 200 stores a calibration table (e.g., in memory 260) representing the focal zones (also referred to simply as "zones") or, equivalently, each respective ones of a finite plurality of fixed focus distances which comprise focal zone. The calibration table may also store other information, such as illumination parameters and/or focus parameters associated with one or more focus distances, focal zones, object distances, range values, etc., as further described herein.

In some implementations, the distances and their associated range values may be stored in memory, for example as a look-up table (LUT) in memory 260 as illustrated by LUT 350 of FIG. 3C. When the distance between the imaging device 200 and object 118 is known, e.g., via a ranging operation, the imaging device 200 (e.g., via the controller such as controller 258, an imaging processor, or other suitable device and/or component) may access the LUT 350 and retrieve the associated range value based on the known distance. The range value may be stored in and/or retrieved from in a memory, such as memory 260, by the imaging device 200 at one or more times, such as proximate conducting a ranging operation, an image capture operation (e.g., hybrid fixed focus, bracketing or ramping operations) or a decode operation. For example, a successful ranging operation detects the distance between an object 118 and the imaging device 200 is fifty-five (55) inches, which according to the LUT entry 355 falls within focal zone ten (10) having a focal zone range spanning distances between fifty and one-tenth (50.1) inches to sixty (60) inches, and has a corresponding range value of sixty (60).

While FIG. 3C illustrates a LUT 350 having focal zone 357, zone range/distance and range value information, among other information, the information may be stored in any other suitable data structure, including but not limited to the calibration table, a list, a database, etc. Furthermore, the quantity and values in the rows and columns of LUT 350 are for illustration purposes only. In other implementations, the LUT 350 may include more, less, and/or a different quantity of rows and/or columns and may include different values and/or types of information. For example, the LUT may include twenty-five (25) focal zones, with each zone range covering a span of eighteen (18) inches.

Further, while the LUT 350 and/or other examples indicate the range value as having values similar to the maximum zone range, this is for illustration purposes only. In other implementations, the range value may be the same value as the focal zone value, an arbitrary value associated with the distance, or any other suitable value. In some implementations, the range value may indicate a numerical value associated with the distance between the imaging device 200 and object 118, such that in some implementations increasing range values correspond to increasing/ farther distances between the imaging device 200 and object 118, and in other implementations decreasing range values may correspond to increasing/farther distances between the imaging device 200 and object 118. In some implementations, the zone and range values may be non-numerical values. For the purposes of discussion herein, increasing numerical range values correspond to increasing/farther numerical distances between the imaging device 200 and the object 118, as illustrated in FIG. 3C.

In at least some implementations, an aiming pattern 330A and/or 330B is detected and an imaging region is identified when a total brightness difference satisfies a pre-determined threshold. When an aiming pattern 330A and/or 330B is not detected, the ranging operation may result in the distance and/or range value to the object being unknown to the imaging device 200.

In some implementations, the imaging device 200 may retrieve the range value from memory such as local memory 260, for example when one or more subsequent ranging operations do not result in a consistent range value, e.g., the range value changes between ranging operations, or when the ranging operation does not result in any range value, e.g., when the distance to an object cannot be determined, resulting in the inability to establish a distance during the ranging operation. In some implementations, the range value in memory is the range value saved during a previous ranging operation and may be the last known range value of the imaging device 200. In at least some implementations, the unknown range value may result in retrieving the last known range value from memory, initiating a subsequent ranging operation, or initiating an imaging operation (e.g., hybrid fixed focus, bracketing, ramping operations) based on the last known range value, or any other suitable action.

In some implementations, the range value, distance to the object 118 and/or focal zone 357 may have associated focus parameters, such as a focal distance/focal length, frame rate, exposure, aperture, shutter speed, ISO, and/or any other suitable parameters which may affect the capturing an image by the imaging device 200 and/or imaging assembly 245. For example, upon determining a distance, range value and/or focal zone 357 associated (e.g., from the LUT 350 based on a ranging operation), the controller such as controller 258, imaging processor, or any other suitable component/device, may send a signal, instruction or other indication to the imaging assembly 245, imaging processor or other suitable component/device comprising the focus parameters associated with the distance, range value and/or focal zone 357. The imaging assembly 245, e.g., via the imager 241 and imaging lens 244, may capture one or more images using the focus parameters, e.g., which may provide a "clear" and/or adequately in-focus image of the object and indicia located thereupon for decoding based on the object's distance. In some implementations, the focus parameters may be stored in the LUT 350, the calibration table, a list, a database and/or other suitable data structure, and further may be stored in a local memory such as local memory 260. Again, the information provided in the LUT 350 is for exemplary purposes only, and as described earlier, may vary in other implementations.

In some implementations, the imaging device 200 may illuminate the FOV when one more images are being captured, such as for subsequent decoding of an indicia located within the one or more images. The illumination light source 251 may be energized, e.g., by a controller such as controller 258, proximate capturing one or more images by the imaging assembly 245. The imaging system (e.g., indicia reader 100, imaging device 200) may determine illumination parameters comprising an illumination light source and associated illumination intensity based upon the ranging operation, the distance between the imaging device 200 (or indicia reader 100) and the object 118, the range value, focus parameters, and/or other suitable information. Returning to the previous example, the ranging operation may determine an object is fifty-five (55) inches from the imaging device 200 and accordingly is located in focal zone sixty (60) having an associated range value of ten (10) per the LUT entry 355. The LUT entry 355 further indicates the illumination source 251 associated with this distance, focal zone 357, and/or range value is the near field LED such as the near field LED described in FIG. 2, the near field LED also having an associated illumination intensity of sixty percent (60%). Proximate an image capture operation of the object 118 at fifty-five (55) inches away from the imaging device 200, the controller 258 may send a signal to the illumination light source 251 to energize the near field LED at an illumination intensity of sixty percent (60%). In some implementations, the illumination source and/or illumination intensity information may be stored in the LUT 350, the calibration table, a list, a database and/or other suitable data structure, and further may be stored in a local memory such as local memory 260. The information provided in the LUT 350 is for exemplary purposes only, and as described earlier, may vary in other implementations.

In at least some implementations, after the ranging operation in which the imaging system (e.g., indicia reader 100, imaging device 200) determines the range value associated with a distance between the imaging system and the object 118, the imaging system may initiate, e.g., via a controller such as controller 258, one or more image capture operation such as the hybrid fixed focus operation, bracketing operation and/or ramping operation described below. In at least some implementations, the ranging operation may precede the image capture operation. In such implementations, if the ranging operation fails to determine a range value, the controller 258 or other suitable processor, component or device may initiate the ramping operation described below. If a range value is required for the ramping operation, the last known range value (e.g., the range value stored in local memory) may be used.

In at least some implementations where the ranging operation precedes each image capture operation and does determine the range value, the range value may be compared to the last known range value (e.g., the last known range value store in local memory). In at least some implementations, if the last known range value is substantially similar to the range value from the instant ranging operation (e.g., indicating the distance to the object being ranged has not changed between the instant ranging operation and a previous ranging operation producing the last known range value), an image capture operation may be initiated following the instant ranging operation. In at least some implementations, if the last known range value is not substantially similar to the range value from the instant ranging operation (e.g., indicating the distance to the object being ranged has changed between the instant ranging operation and a previous ranging operation producing the last known range value), one or more subsequent ranging operation(s) may be initiated until the most recent ranging operation both determines a range value, and also the last known range value is substantially similar to the range value of the most recent ranging operation.

In at least some embodiments, the imaging system may initiate a non-hybrid fixed focus operation capturing one or more images at a fixed focus position, i.e., using focus parameters and/or illumination parameters associated with the focus distance (i.e., as indicated by the ranging operation/range value) within a single focal zone. For example, the ranging operation may indicate the object 118 is located at a distance of thirty (30) inches from the imaging device 200, in focal zone 357 thirteen (13) and having a range value of thirty (30). The controller may then initiate the imaging assembly 245 to capture one or more images using focus parameters and illumination parameters associated with the thirty (30) inch fixed focus distance associated with focal zone 357 thirteen (13) and/or range value thirty (30), e.g., as indicated by the LUT, the calibration table, etc.

As previously described, in some situations the ranging operation may erroneously, or fail to, indicate the distance between the imaging device 200 and the object 118, e.g., if initiating the ranging operation before aiming at the object 118. This may cause the imaging device 200 to use focus and/or illumination parameters associated with the erroneous distance, resulting in capturing blurry and/or overexposed images, the inability to decode indicia within captured image data, the need for a user to scan an object 118 more than once to obtain a successful decode of an indicia associated with the object 118, decreased checkout speed, inconvenience and frustration of the user, among other things.

Figure 4A:
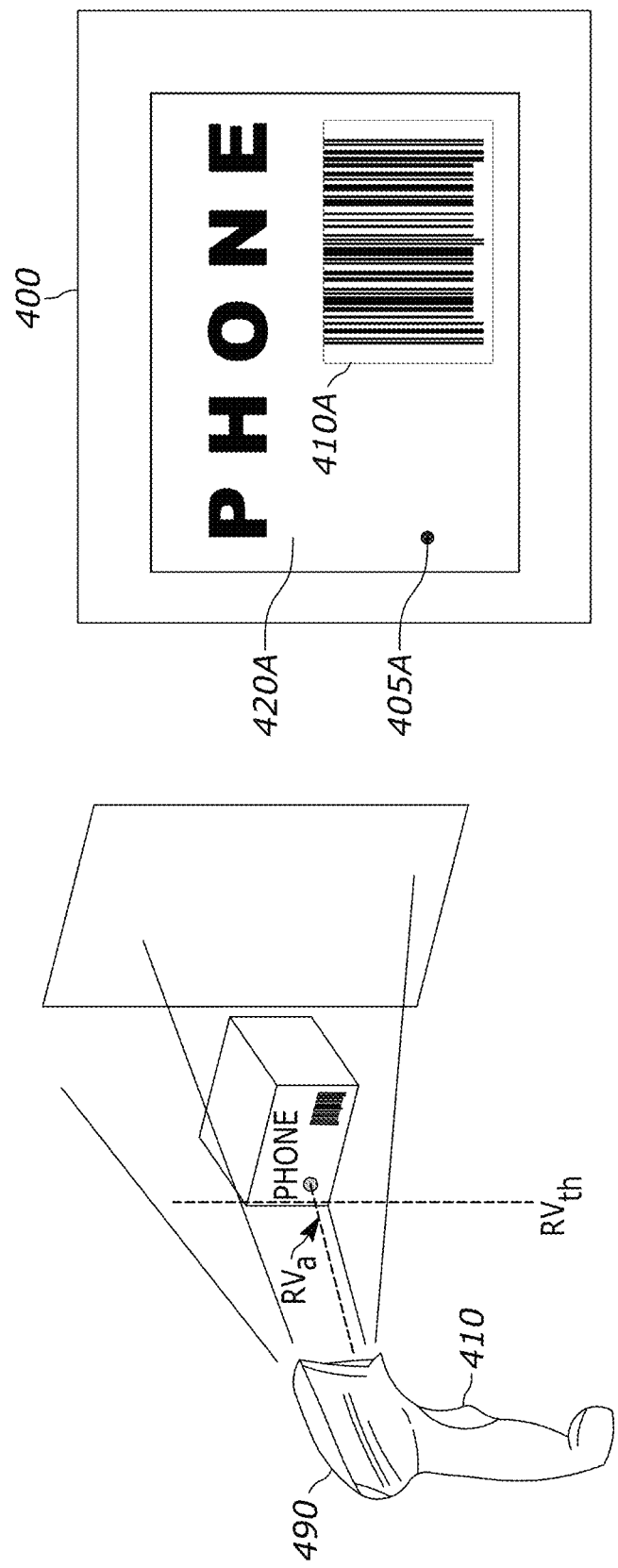
FIG. 4A illustrates an example field of view (FOV) in which an example imaging device aims an aiming pattern onto an object and focuses on the object.
Figure 4B:
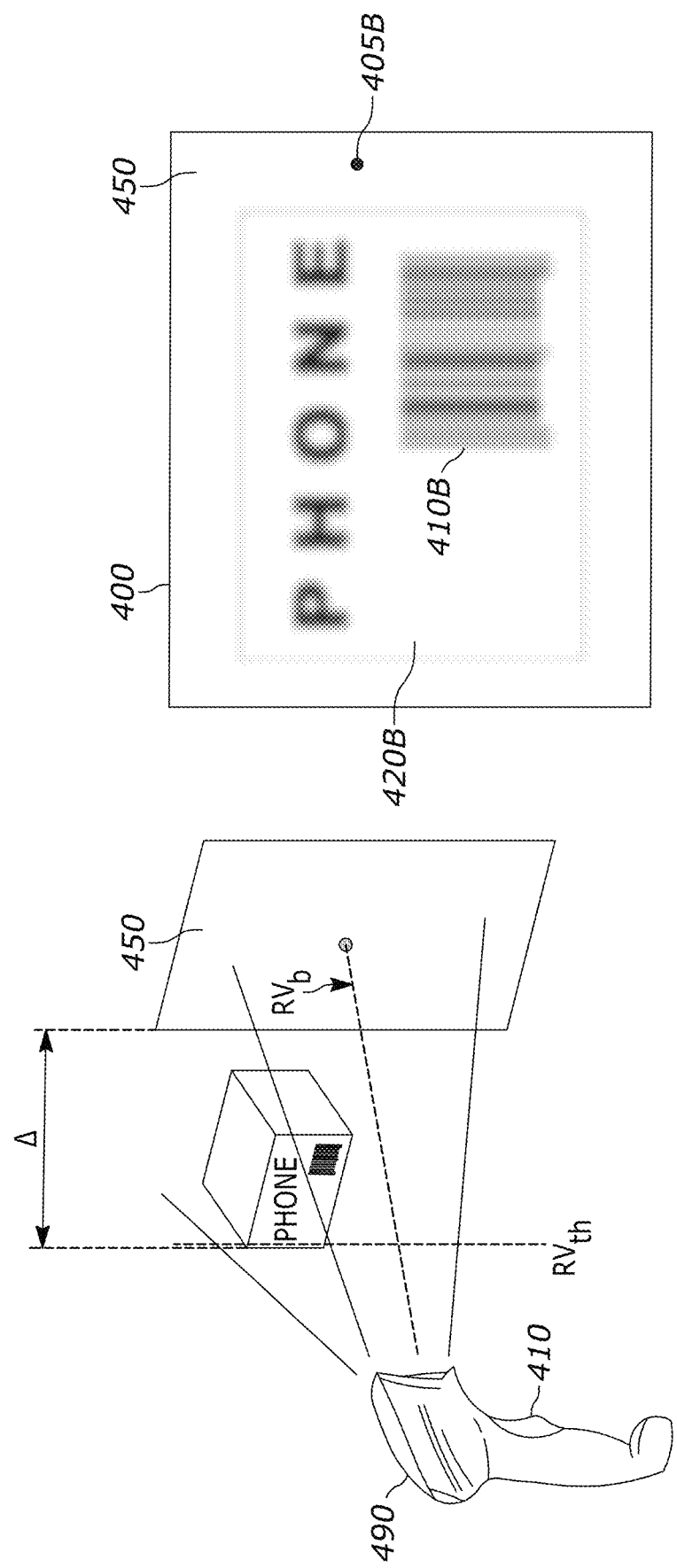
FIG. 4B illustrates an example FOV in which an example imaging device aims an aiming pattern beyond an object, causing images of the object to be blurry.

Referring next to FIGS. 4A and 4B, an imaging device 490 (e.g., indicia reader 100, imaging device 200, etc.) focuses to capture images of a FOV 400. In particular, FIG. 4A depicts an embodiment in which the imaging device 490 properly aims an aiming pattern 405A onto an object 420A, and the imaging device 490 focuses on the object 420A. As such, the object 420A and a decode indicia 410A (e.g., barcode) associated with the object 420A are adequately in-focus (e.g., clear) in the image of the FOV 400. FIG. 4B, however, depicts an embodiment in which the imaging device 490 aims an aiming pattern 405B past the object 420B, and instead the imaging device 490 focuses on a second object 450 (e.g., a wall) a distance A away from the object 420B. For example, this may occur when a user of the imaging device 490 initiates the ranging operation while the imaging device 490 is in motion and pointing at the second object 450 and before being aimed at the object 420A. As such, the object 420B and a decode indicia 410B associated with the object 420B appear out-of-focus (e.g., blurry) in an image of the FOV 400.

To address the shortcomings of erroneous distance information, the imaging system (e.g., indicia reader 100, imaging device 200, imaging device 490, etc.), may initiate a hybrid fixed focus operation. In at least some implementations, a threshold range value is stored in local memory such as memory 260. Where the ranging operation indicates a distance to an object having an associated range value which does not exceed the range value threshold, the hybrid fixed focus operation may proceed similar to the just-described non-hybrid fixed focus operation, i.e., capturing one or more images at a fixed focus position using focus parameters and/or illumination parameters for the fixed focus position associated with the range value (or its associated distance, focal zone, etc.) indicated by the ranging operation. However, if the ranging operation returns a distance having an associated range value which does exceed the threshold range value, the hybrid fixed focus operation proceeds to capture one or more images at a fixed focus position using focus parameters and/or illumination parameters associated with the threshold range value. In such an implementation, the threshold range value may have associated fixed focus position focus parameters and/or illumination parameters which may provide optimal conditions for capturing an image of the object, or may other have better focus/illumination parameters than those associated with a fixed focus position according to the range value which exceeds the threshold range value, either of which may increase the likelihood that an adequately in-focus and/or clear image of an object and its associated indicia will be captured resulting in an indicia decode. As further described below, a hybrid fixed focus operation may be carried out more than once, such as more than once before a termination signal is received by the imaging system. In at least some embodiments where a hybrid fixed focus operation is carried out more than once, the threshold range value may not be used during all ranging operations preceding the hybrid fixed focus operation. For example, the threshold range value may only be used during the first ranging operation preceding the first hybrid fixed focus operation. In such example embodiments, additional ranging operations preceding additional hybrid fixed focus operations beyond the first fixed hybrid fixed focus operation would results in honoring the range value from the additional ranging operations, whether exceeding a threshold range value or not.

Again, for the purposes of discussion herein, increasing numerical range values correspond to increasing/farther numerical distances between the imaging system and the object. Accordingly, and as described herein, a range value exceeding a threshold range value is associated with a distance (i.e., indicted by the range value) exceeding and being greater than the threshold distance (i.e., indicated by the threshold range value). In other implementations, the range value may have an inverse relationship with the distance between the imaging system and the object, such that a range value exceeding a threshold range value is associated with a distance being closer than the threshold distance respectively, however, implementations having an inverse relationship between distance and range values will not be illustrated herein.

Returning to FIGS. 4A and 4B, a user may initiate a ranging operation by engaging the trigger 410 of the imaging device 490. In response, a controller such as controller 258, an imaging processor, or other suitable device and/or component may energize the aiming light source 223 to project the aiming light (i.e., aiming patterns 405A, 405B) into the FOV 400. The controller, the imaging processor, or other suitable device and/or component may initiate the imaging assembly 245 to capture one or more images comprising image data of the FOV 400. The imaging device 490 determines (e.g., via the controller, the imaging processor, or other suitable device and/or component) the range value associated with a distance between the imaging device 490 and the object 420A, 420B in the FOV 400. The imaging device 490 retrieves the threshold range value from local memory such as memory 260, the threshold range value and/or associated threshold distance being indicated in FIGS. 4A and 4B as $RV_{th}$. The imaging device 490 (e.g., via the controller, the imaging processor, or other suitable device and/or component) compares the range value to the threshold range value and initiates the hybrid fixed focus operation. The controller, the imaging processor, or other suitable device and/or component, then initiates the hybrid fixed focus operation and energizes the illumination assembly (e.g., illumination light source 251 and illumination lens 252) to provide illumination of the FOV 400 during the hybrid fixed focus operation, and captures by the imaging assembly 245 a first set of one or more images comprising image data of the environment appearing in the FOV 400 at a fixed focus position.

In one embodiment illustrated by FIG. 4A, the range value and/or associated distance to the object 420A from the ranging operation is indicated as $RV_a$ and does not exceed the threshold range value $RV_{th}$. According to the hybrid fixed focus operation, the fixed focus position will correspond to the range value $RV_a$, which results in capturing one or more clear and/or adequately in-focus images of the object 420A and associated decode indicia 410A and further providing a successful decode of the decode indicia 410A via the controller (e.g., by being sent to a decoder) or other suitable device and/or component.

In one embodiment illustrated by FIG. 4B, the range value and/or associated distance to the object 420B from the ranging operation is indicated as $RV_b$, and does exceed the threshold range value $RV_{th}$. According to the hybrid fixed focus operation, the fixed focus position will correspond to the threshold range value $RV_{th}$. As a result, instead of capturing blurry and/or out-of-focus images of the object 420B and associated decode indicia 410B, the hybrid fixed focus operation using the fixed focus position according to threshold range would result in capturing one or more clear and/or adequately in-focus images similar to the of the object 420A and associated decode indicia 410A of FIG. 4A, allowing for the successful decode of the decode indicia 410A.

In at least some implementations, the threshold range value (or associated focal zone or distance) may be associated with an optimal distance (or distance range) at which an object being scanned is expected to be located. For example, a grocery store may determine that shoppers using a handheld indicia reader 100 generally scan items at a distance of no more than twenty-four (24) inches, which has an associated range value of thirty (30). Therefore, if a ranging operation at the grocery store indicates a shopper is scanning an item having a range value of one hundred and fifty (150) and associated distance of one hundred forty-five (145) inches from the handheld indicia reader 100, it may be likely that the distance and associated range value indicated by the ranging operation are erroneous. Conversely, if the ranging operation at the grocery store indicates scanning an item having a range value of twenty (20) which is eighteen (18) inches from the handheld indicia reader 100, the distance and associated range value of the item indicated by the ranging operation may likely be valid. If the ranging operation indicating the range value of one hundred and fifty (150) for an item hundred forty-five (145) inches from the handheld indicia reader 100 is indeed erroneous and the item at most twenty-four (24) inches away, the hybrid fixed focus operation would disregard the erroneous range value which exceeds the threshold range value, and instead capture images using the fixed focus position corresponding to the threshold range value. In doing so, the associated focus parameters and/or illumination parameters may provide improved conditions for capturing images, and an increased likelihood of, decoding an indicia located on the object as compared to using a fixed focus position corresponding to the range value of one hundred and fifty (150).

For example, the threshold range value based upon an associated distance at which a scanned object is likely to be located from the imaging assembly 245, as just illustrated with the grocery store example. In some implementations, the threshold range value may be determined based upon historical range values from historical ranging operations of an imaging system, such as range values which resulted in successful decodes of indicia. For example, an imaging device 200 successfully decoded the indicia on ninety-five (95) of the last one hundred (100) objects being scanned. Ranging operations preceding the ninety-five (95) successful decodes each indicated range value of fifty (50) with the 5 failed decodes having range values above fifty (50), such that a range value of fifty (50) may be an optimal threshold range value when analyzing historical range values. In some implementations, analyzing historical range values to determine one or more optimal threshold range values may be implemented using algorithms, artificial intelligence such as machine learning, etc. One or more threshold range values may be determined in any other suitable manner.

In some implementations, threshold range values may be automatically determined and stored in local memory (e.g., via software applications, algorithms, or other suitable means), recommended to a user of the imaging system who then stores one or more preferred threshold range values in memory (e.g., via a user interface of the imaging system or other suitable means of storing the threshold range value in memory), or stored in memory in any other suitable manner.

In at least some embodiments, the imaging system may store or be provided more than one threshold range value. In such embodiments, the imaging system may be able to use more than one threshold value. For example, a user may be provided (e.g., via a user interface associated with the imaging system) multiple threshold range values and select one for use during at least one scan. In one example, different threshold range values may be used according to a schedule, e.g., a first threshold range value during morning hours on weekdays when an indicia reader 100 is being used for inventory and scanning barcodes applied to milk crates which often results in incorrect range values, and a second threshold value at all other times/dates when the indicia reader 100 is being used for self-checkout by customers.

In at least some implementations, after the hybrid fixed focus operation (whether it results in a successful decode or not), the imaging system (e.g., indicia reader 100, imaging device 200, etc.) may conduct subsequent ranging operations and/or non-hybrid fixed focus imaging operations as described herein. In at least some implementations, if the imaging system is unable to decode an indicia during the hybrid fixed focus operation based on the threshold range value, the imaging system may subsequently conduct a non-hybrid fixed focus operation using the range value which exceeded the range value threshold, a new range value from a new ranging operation, a range value stored in memory, or any other suitable range value.

In at least some implementations, after performing the hybrid fixed focus operation, the imaging system may initiate a bracketing operation to capture one or more images using multiple object distances and/or multiple focus distances within a single focal zone. The bracketing operation may include a range value and/or focus parameters, illumination parameters, or other information associated with a range value. The range value for the bracketing operation may be the range value stored in memory, the range value from a new ranging operation, the threshold range value, the range value from a previous image capture operation such as the range value determined during a hybrid fixed focus operation, or any other suitable range value.

The multiple focus distances of the bracketing operation may include a series of successive focus distances proximate one another and within a single focal zone. Using an example with reference to the values in LUT 350 of FIG. 3C, a ranging operation preceding the bracketing operation may determine an object is located twenty-five (25) inches from the imaging system, which indicates an associated focal zone of thirteen (13) having a focal zone range of twenty and one-tenth (20.1) inches through thirty (30) inches. During the bracketing operation for the focus distance of twenty-five (25) inches, the imaging system may successively capture a series of six (6) images of the object, with one image each captured at focus distances of (i) twenty and one-tenth (20.1) inches, (ii) twenty-two (22) inches, (iii) twenty-four (24) inches, (iv) twenty-six (26) inches, (v) twenty-eight (28) inches, and thirty (30) inches, all of which fall within focal zone thirteen (13). The one or more images captured at the six various focus distance may each use the focus parameters and illumination parameters associated with their respective focus distances, e.g., those indicated by the LUT 350, the calibration table, etc. As with other image capture operations, the values provided in the bracketing focus operation example are for illustration purposes only. For example, the number of images captured, focus distances, the order of focus distances at which the images are captured, and/or other parameters may be different in other examples and/or implementations.

In some implementations, such as when a distance cannot be determined during a ranging operation, when other image capture operations (e.g., the hybrid fixed focus or bracketing operations) do not result in a successful indicia decode, or in any other suitable scenario, the imaging system (e.g., indicia reader 100, imaging device 200) may initiate a ramping operation. During the ramping operation, the imaging system may successively capture one or more images at one or more associated focal zones. In some implementations, the ramping operation may include at each focal zone, the imaging system initiating the imaging assembly 245 to the focus parameters corresponding to a specific focal zone, object distance and/or range value (e.g., according to LUT 350); energizing (or keeping energized) the illumination light source 251 according to illumination parameters corresponding to the specific focal zone, object distance and/or range value (e.g., according to LUT 350); capturing one or more images at the specific focal zone; and attempting a decode operation to decode an indicia within the one or more captured images. If the decode operation is successful, the ramping operation may end. If the decode is not successful, the ramping operation may repeat the aforementioned steps for another focal zone as part of a ramping sequence. The ramping sequence may include moving through successive focal zones in an incremental manner. This may include successively ramping up or ramping down through all the focal zones during the ramping sequence, i.e., moving from focal zone fifteen (15), then to focal zone fourteen (14), then to focal zone thirteen (13), etc., eventually down to zone zero (0) if the ramping sequence is not ended, and then ramping in the other direction, i.e., moving from focal zone zero (0), then to focal zone one (1), then to focal zone two (2), etc., and so on.

In at least some implementations, an image capture operation such as the hybrid fixed focus operation, bracketing operation and/or the ramping operation may come to an end upon receiving (e.g., by the controller 258) a terminal signal. The terminal signal may be received in response to the successful decode of an indicia in the captured image data, the user of the imaging system ending the scanning operation (e.g., by releasing the trigger 110 of an indicia reader 100), a system fault or loss of power, or any other suitable condition causing a terminal signal to be received. In at least some implementations, the image capture operation may come to an end due to a timeout (e.g., if after sixty (60) seconds, the imaging system doesn't receive the termination signal), or in any other suitable manner.

Figure 5:
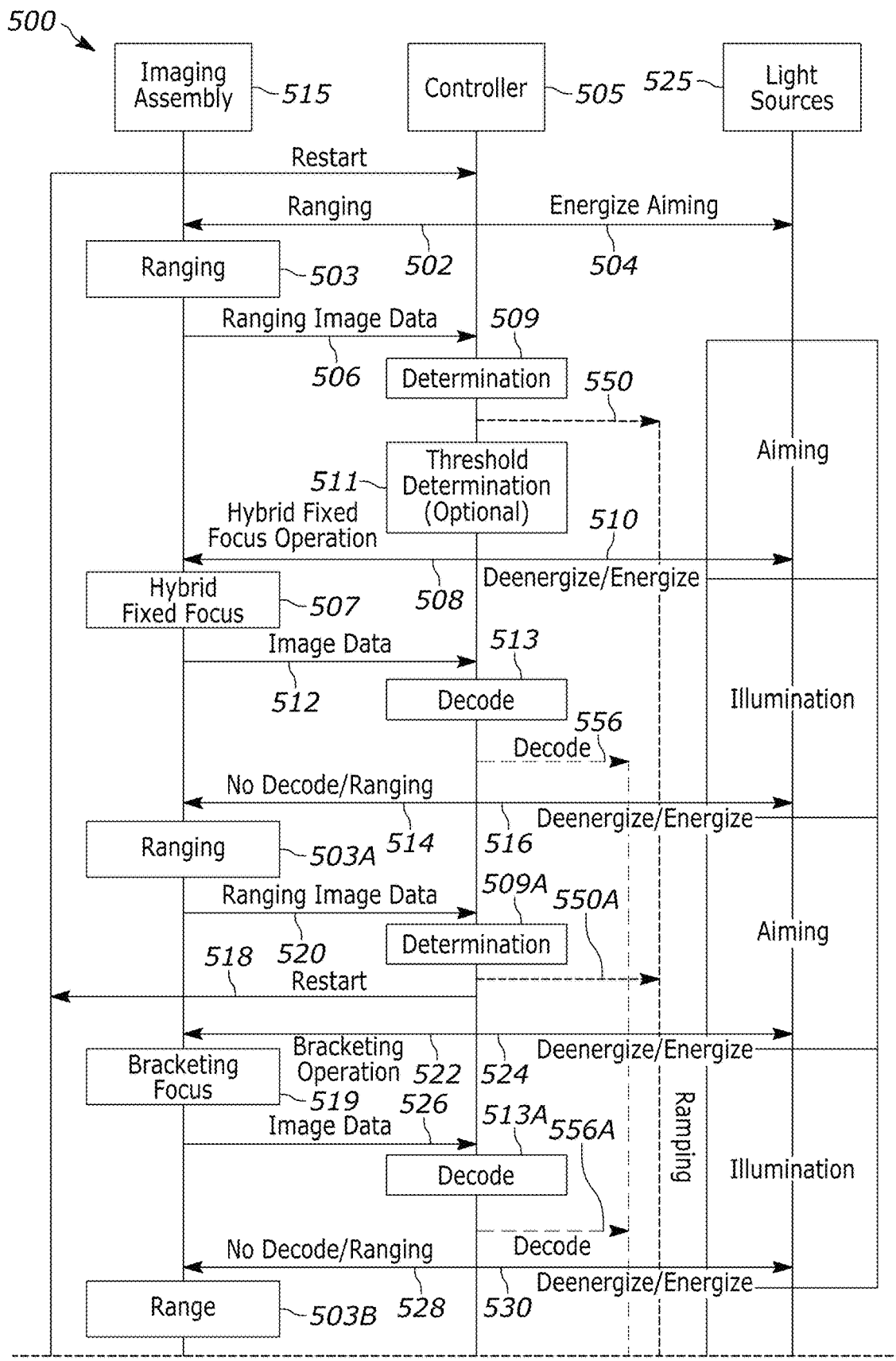
FIG. 5 illustrates a signal diagram of an example scenario for providing a hybrid fixed focus during operation of an indicia reader according to the techniques described herein.
Figure 5:
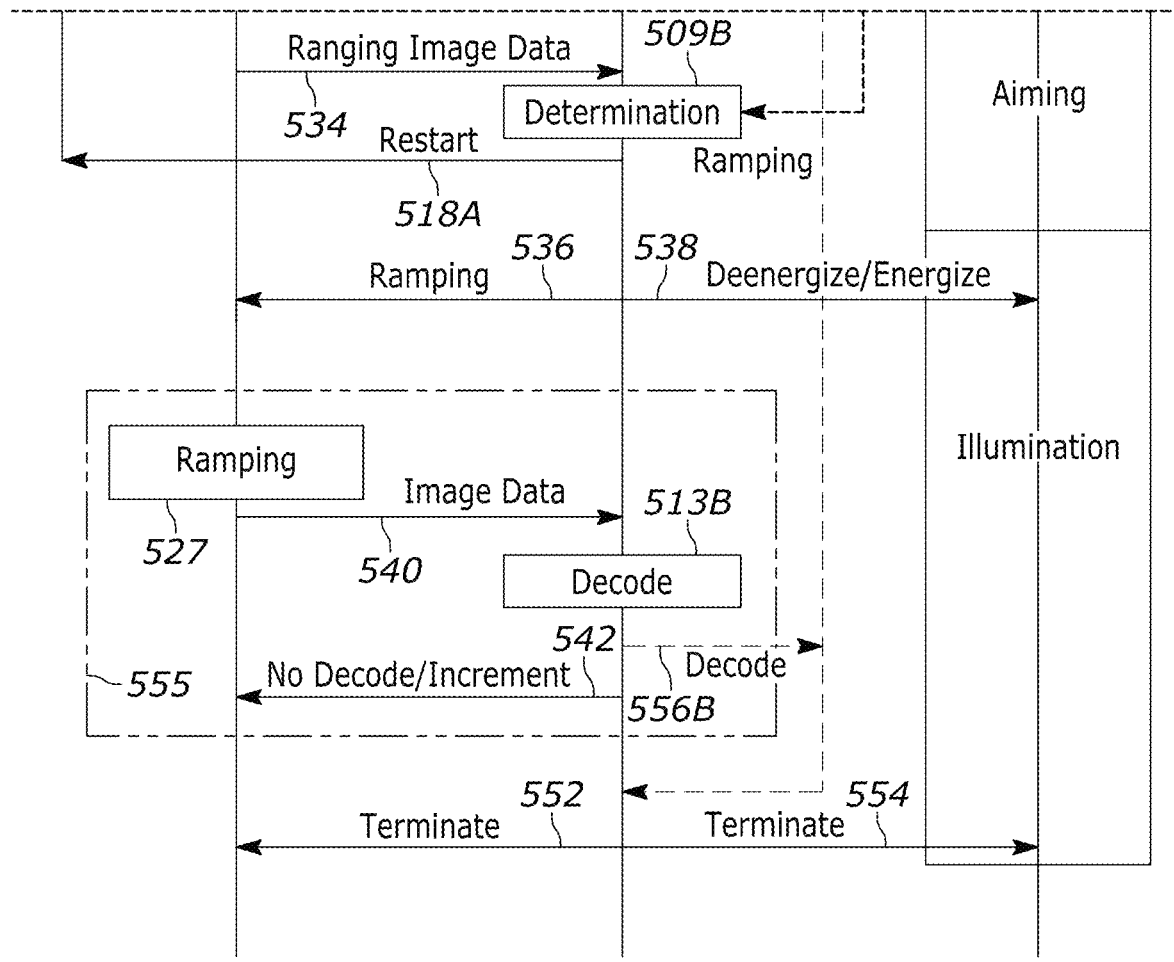

Referring next to FIG. 5, in a scenario 500, an imaging system controller 505 communicates with an imaging assembly 515 and light sources 525. In some implementations, the light sources 525 may include an aiming source (e.g., aiming light source 223) and illumination light source(s) (e.g., illumination light source 251 including a far field illumination light source and a near field illumination light source). Depending on the implementation, some of the controller 505, imaging assembly 515 and/or light sources 525 may be components of the same device and transmissions as described below may be or include messages, signals, instructions or other indications that are transmitted internally. In further implementations, each or any one of the of the controller 505, imaging assembly 515 and light sources 525 may be different devices and transmit the transmissions between the different devices.

In the scenario 500, the controller 505 initializes the scenario 500 by transmitting 502 a signal to the imaging assembly 515 to initiate a ranging operation 503, and also transmits 504 a signal to the light sources 525 to energize the aiming light source for the ranging operation 503. In some implementations, the controller 505 receives a signal to initiate the image acquisition process of scenario 500 when a user of the imaging system (e.g., indicia reader 100, imaging system 200) engages a trigger of the indicia reader, such as trigger 110, upon detection of an object, such as a user or object to be scanned, at the imaging system, or any other suitable signal.

The aiming light source is energized by the light sources 525 in response to transmission 504 at a time proximate the ranging operation 503, and provides a light beam, such as aiming pattern 330A, 330B for the ranging operation 503. In response to transmission 502, the imaging assembly 515 captures one or more images during the ranging operation 503, as previously discussed with respect to FIGS. 3A and 3B. The imaging assembly 515 transmits 506 the image data from the ranging operation 503 to the controller 505.

In general, upon receiving the image data from a ranging operation, such as ranging operations 503, 503A, 503B, the controller 505 attempts to determine 509, 509A, 509B distance information, which may also include determining one or more range values, focus parameters and/or illumination parameters associated with the distance information (e.g., via LUT 350). With respect to ranging operation 503, if the controller 505 cannot determine 509 a distance based upon the transmission 506 from the imaging assembly 515, the controller 505 transmits 550 a signal to initiate a ramping operation 527, as further described herein.

If the controller 505 successfully determines 509 the distance and associated range value (e.g., via LUT 350) based upon the transmission 506, the controller 505 retrieves a threshold range value locally from a memory and compares the range value to the threshold range value during a threshold determination 511. The controller 505 transmits 508 a signal to the imaging assembly 515 initiating a hybrid fixed focus operation 507. Where the controller determines 511 the range value does not exceed the threshold range value, the signal of the transmission 508 may indicate to the imaging assembly 515 the range value and associated focus parameters (e.g., from LUT 350). Where the controller determines 511 the range value does exceed the threshold range value, the signal of transmission 508 may indicate to the imaging assembly 515 the threshold range value and associated focus parameters (e.g., from LUT 350). As previously described, in some embodiments, the threshold determination 511 may not be required, for example it may only occur once during scenario 500 such as only the first time ranging operation 503 takes place during scenario 500, only before the first hybrid fixed focus operation 507, or any other suitable condition. Accordingly, the threshold determination 511 is depicted in FIG. 5 as optional.

The controller 505 also determines 511 the illumination parameters (e.g., via LUT 350) associated with the range value when the range value does not exceed the threshold range value and determines 511 the illumination parameters associated with the threshold range value when the range value does exceed the threshold range value. The controller 505 transmits 510 a signal to light sources 525 indicating the illumination parameters associated with the threshold range value (i.e., when the threshold range value was exceeded by the range value) or the illumination parameters associated with the range value (i.e., when the threshold range value was not exceeded by the range value). In response to the transmission 510, the lights sources 525 illuminate one or more illumination sources, as further described below.

The transmission 510 also includes a signal to deenergize the aiming light source responsive to the ranging operation 503 being complete. While FIG. 5 depicts the aiming light source as being instructed to energize with transmission 504 and deenergize with transmission 510, the aiming light source may not be energized for the entire duration between these two transmissions 504, 510. For example, transmission 504 may including timing information, such that the aiming light source is only energized for a portion of time between transmissions 504, 510, such as during at least only portions of the ranging operation 503, outside of the ranging operation 503, or any other suitable timing. In such an example, the aiming light source may already be deenergized when light sources 525 receive transmission 510. Accordingly, the depiction of the aiming light source being energized throughout FIG. 5 is for illustration purposes only, and may vary in other implementations and examples, especially as depicted with respect to the aiming light source being deenergized/energized for a ranging operation, such as ranging operations 503, 503A, 503B, etc.

In response to the transmission 510, light sources 525 energize the illumination light source(s) according to illumination parameters (e.g., a far field LED, a near field LED, an illumination intensity, etc. as indicated by LUT 350) associated with the range value or threshold range value determined by the controller 505 from ranging operation 503. Once energized, the illumination light source(s) may illuminate the object proximate the time of the hybrid fixed focus capture operation 507 using the illumination intensity of the illumination parameters. The illumination from the energized illumination light source(s) may provide proper exposure of the object and/or indicia for capturing images during the hybrid fixed focus operation 507.

During the hybrid fixed focus operation 507, the imaging assembly 515 uses the focus parameters of transmission 508 when capturing one or more images comprising image data of the object having an indicia located thereupon, and within the FOV of the imaging system. Upon completion of the hybrid fixed focus operation 507, the imaging assembly 515 transmits 512 the image data from the hybrid fixed focus operation 507 to the controller 505. In general, although FIG. 5 depicts in the scenario 500 the imaging assembly 515 capturing and transmitting the image data of the one or more images captured at various times in the same transmission (e.g., transmissions 506, 512, 520, 526, etc.), the imaging assembly 515 may capture each image separately and transmit the associated image data separately, capture and/or transmit less than all the images and image data separately, any combination thereof, or in any other suitable manner.

Next, the controller 505 attempts to decode 513 the indicia, such as a barcode, in the image data of transmission 512. Upon a successful decode 513, the controller 505 may transmit 556 a signal, which results in controller 505 transmitting terminals signals via transmission 552 to the imaging assembly 515 and transmission 554 to light sources 525, ending the scenario 500. In some implementations, the termination indications may result in the light sources 525 deenergizing as a result of the transmission 554, and/or the imaging assembly initializing to focus parameters which may be indicated in the transmission 552, terminating image capture, and/or other suitable response.

If the controller 505 does not successfully decode 513 the indicia from the image data, the controller 505 may transmit 514 a signal to the imaging assembly 515 indicating there was not a successful decode, and accordingly instruct the imaging assembly 515 to initiate a second ranging operation 503A. The second ranging operation 503A may operate similarly to the first ranging operation 503, i.e., to detect the distance between the indicia reader and the object, as the distance may have changed between the first ranging operation 503 and second ranging operation 503A.

If the controller 505 does not successfully decode 513 indicia from the image data of transmission 512, the controller also transmits 516 a signal to the light sources 525 to energize the aiming light source proximate the second ranging operation 503A, as was similarly done with transmission 504. The transmission 516 may also indicate the light sources 525 deenergize the illumination light source(s), e.g., as a result of the completion of the hybrid fixed focus operation 507. Similar to the aiming light source, while FIG. 5 generally depicts the illumination light source(s) as being instructed to energize via transmission 510 and deenergize via transmission 516, the illumination light source(s) may not be energized for the entire duration between these two transmissions 510, 516. For example, transmission 510 may including timing information, such that the illumination light source(s) is only energized for a portion of time between transmissions 510, 516, such as during at least only portions of the hybrid fixed focus image capturing operation 507, outside of the hybrid fixed focus image capturing operation 507, or any other suitable timing. In such an example, the illumination light source(s) may already be deenergized when light sources 525 receives transmission 516. Accordingly, the depiction of the illumination light source(s) in FIG. 5 is for illustration purposes only and may vary in other implementations and examples, especially as depicted with respect to the illumination light source(s) being deenergized/energized for an operation, such as operations 507, 519, 503A, etc.

In response to transmission 514, the imaging assembly initiates the second ranging operation 503A. As with the first ranging operation 503, the imaging assembly 515 captures one or more images during the ranging operation 503A. The imaging assembly 515 transmits 520 the image data from the ranging operation 503A to the controller 505.

If the controller 505 cannot determine 509A a distance based upon the transmission 520 from ranging operation 503A, the controller 505 transmits 550A a signal to the initiate the ramping operation 527.

If the second ranging operation 503A determination 509A indicates the distance between the indicia reader and the object has changed since the first ranging operation 503, the scenario 500 may restart from the beginning according to the controller 505 transmission 518, i.e., restarting the sequence 500 with the controller 505 issuing signals 502, 504 when suitable. As previously described, in some embodiments the threshold determination 511 may only occur once. Thus, if restarting sequence 500 in light of transmission 518, threshold determination 511 may not occur.

If the controller 505 successfully determines 509A the distance and associated range value, and the distance remains the same as the previous distance determination 509, even if the distance and/or associate range value exceeds the threshold range value, the controller also determines 509A the range value and focus parameters (e.g., via LUT 350) based upon the transmission 520. The controller 505 transmits 522 a signal of the determinations to the imaging assembly 515, which then carries out a bracketing focus operation 519, i.e., capturing a plurality of images throughout a focal zone, as described with respect to FIG. 3C. As with the hybrid fixed focus operation 507, the bracketing focus operation 519 includes the controller 505 transmitting 524 a signal to the light sources 525. The transmission 524 may instruct the light sources 525 to deenergize the aiming light source proximate the completion of the second ranging operation 503A. The transmission 524 also includes illumination parameters which instruct the light sources 525 to energize an appropriate illumination light source(s) (e.g., the near field LED or far field LED) according to an illumination intensity associated the range value from ranging operation 503A. The light sources 525 may energize the illumination light source(s) based on transmission 524 proximate the bracketing focus operation 519.

The imaging assembly 515 may transmit 526 image data from the plurality of images captured during the bracketing focus operation 519 to the controller 505 to decode 513A an indicia contained in one or more images of the image data. Upon a successful decode 513A, the controller 505 may transmit 556A a signal, which results in a transmission 552 of a termination signal to the imaging assembly 515 and transmission 554 of a termination signal to the light sources 525 respectively, ending the scenario 500 as previously discussed. If the controller 505 does not successfully decode 513A indicia from the image data, it may transmit 528 a signal to the imaging assembly 515 to conduct a third ranging operation 503B. The third ranging operation 503B may be similar to the first 503 and second 503A ranging operations.

If the controller 505 does not successfully decode 513A indicia from the image data of transmission 526, the controller also transmits 530 a signal to the light sources 525 to energize the aiming light source proximate the third ranging operation 503B, as was similarly done with transmissions 504, 516. The transmission 530 may also indicate the light sources 525 deenergize the illumination light source(s), e.g., as a result of the completion of the bracketing focus operation 519.

In response to transmission 528, the imaging assembly 515 initiates the third ranging operation 503B. As with the other ranging operations 503, 503A, the imaging assembly 515 captures one or more images during the ranging operation 503B. The imaging assembly 515 transmits 534 the image data from the ranging operation 503B to the controller 505.

If the controller 505 cannot determine 509B a distance based upon the transmission 534 from ranging operation 503B, the controller 505 transmits 536 a signal for the imaging system to initiate the ramping operation 527 using focus parameters associated with the last known range value (e.g., stored in memory and retrieved by controller 505 during determination 509B), as previously described.

If the controller 505 determines 509B the distance between the indicia reader and the object has changed since the second ranging operation 503A, the scenario 500 may restart from the beginning according to the controller 505 transmission 518A, i.e., restarting the sequence 500 with the controller 505 issuing signals 502, 504, similar to indication 518. As previously described, in some embodiments the threshold determination 511 may only occur once. Thus, if restarting sequence 500 in light of transmission 518A, threshold determination 511 may not occur.

If the controller 505 successfully determines 509B the distance from transmission 534, and the distance remains the same as the previous distance determination 509A, the controller 505 determines 509B the range value, focus parameters and illumination parameters (e.g., via LUT 350) based upon the transmission 534. Next, the controller 505 transmits 536 a signal of indicating the focus parameters to the imaging assembly 515, which then carries out the ramping operation 527.

As with the hybrid fixed focus operation 507 and the bracketing focus operation 519, the ramping operation 527 may include the controller 505 transmitting 538 a signal to light sources 525. The signal may instruct the light sources 525 to deenergize the aiming light source proximate the completion of the third ranging operation 503B. The transmission 538 may also include illumination parameters (i.e., determined 509B by the controller 505) instructing the light sources 525 to energize appropriate illumination light source(s) (e.g., the near field LED or far field LED) according to an illumination intensity associated with the range value from ranging operation 503B. The light sources 525 may energize the illumination light source(s) based on transmission 538 proximate the ramping operation 527.

In at least some implementations, if the scenario 500 leads to the ramping operation 527 responsive to the controller 505 being unable to determine 509, 509A, 509B a distance based upon one or more ranging operations 503, 503A, 503B, the controller 505 may determine 509B illumination parameters and/or focus parameters based upon the last known range value stored in memory.

In some implementations, as a result of the imaging system being unable to successfully decode 513, 513A an indicia after the hybrid fixed focus operation 507 and the bracketing focus operation 519, respectively, and after the controller 505 determines 509B the distance has not changed, the imaging assembly 515 enters the ramping operation 527. In some implementations, as a result of the controller 505 being unable to determine 509, 509A, 509B a distance based upon one or more ranging operations 503, 503A, 503B, the imaging assembly 515 enters the ramping operation 527.

The ramping operation 527 may include capturing a plurality of images at various focal distances/across sequential focal zones, as previously described. In at least some embodiments, the focal distances may incrementally increase or decrease throughout various focal distances, resulting in the imaging assembly 515 capturing images across the entire range of focal distances (unless terminated) in an attempt to obtain a clear and/or adequately in-focus image of the indicia to successfully decode 529 the indicia.

Proximate entering the ramping operation 527, the light sources 525 may energize the illumination light source(s) (e.g., the near field LED or far field LED) according to an illumination intensity associated with the illumination parameters from transmission 538 from the controller 505.

The ramping operation 527 may be ramped and incremented throughout steps of various focal distances. During each step of the ramping operation 527 having an associated focal distance, the imaging assembly may capture one or more images containing image data, which it transmits to the controller 505 for indicia decoding. For example, during the ramping operation 527, the imaging assembly 505 may start at a first ramping step equivalent to imaging an object indicated at three (3) inches from the indicia reader based upon a ranging operation. The controller 505 may determine 509B the range value associated with three (3) inches and transmit 536 associated focus parameters to the imaging assembly 515. The imaging assembly 515 may set a focal distance according to the focus parameters, and captures multiple images at that focal distance. The imaging assembly may transmit 540 the image data 540 to the controller 505 to decode 513B the image data from the ramping 527. If an indicia is successfully decoded 513B, the sequence 500 ends with the controller 505 initiating a transmission 556B which results in transmissions 552, 554 to the imaging assembly 515 and light sources 525 respectively indicating termination, as previously described.

If there is no successful decode 513B, the ramping operation enters a ramp incrementing loop 555. While in the loop 555, the controller 505 transmits a signal 542 to the imaging assembly 515 to ramp to the next, incremented step in the ramping operation 527. This includes ramping the focal distance to a next value associated with the incremented step, whether that includes increasing or decreasing the focal distance as the ramping operation 527 may include either as a next step, i.e., whether ramping down versus ramping up as previously described. The imaging assembly 515 then captures one or more images associated with the incremented step, transmits 540 the image data from the images of the incremented step for subsequent decoding 513B by the controller 505. Incrementing the ramping operation to the next step may be repeated ad infinitum in the ramp incrementing loop 555, until a successful decode 516B from one or more images at one or more steps, resulting in transmission 556B. In some implementations, the sequence 500 exits the loop 555 when the controller 505 transmits 552, 554 termination indications, e.g., as a result of the user releasing the trigger of the indicia reader, or any other suitable reason.

While the exemplary sequence 500 depicts the range value as being determined by the controller 505, this is for illustration purposes only. In some implementations, imaging assembly 515, another controller, a processor, or other suitable component/device associated with the imaging system may determine the range value.

Figure 6A:
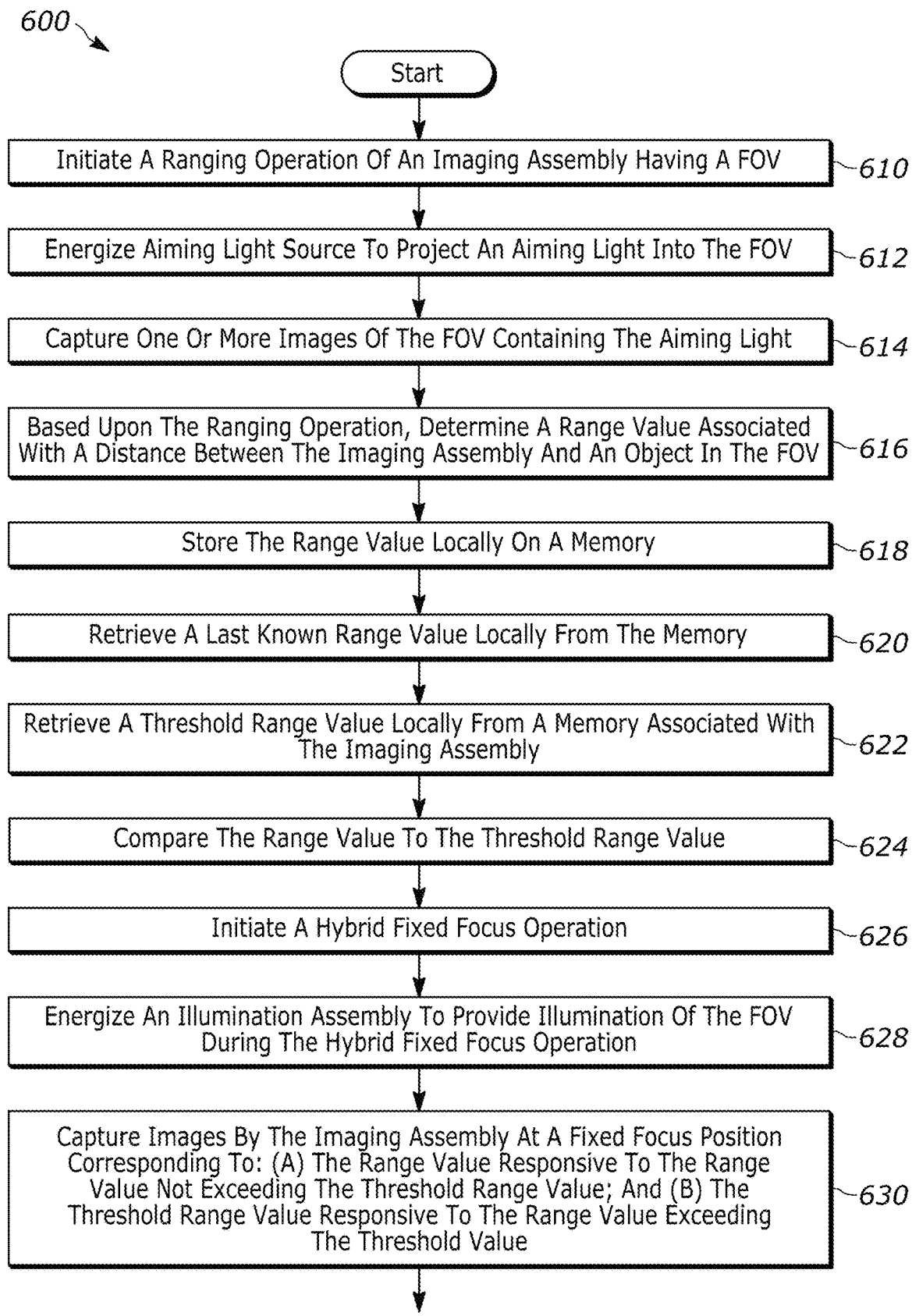
FIGS. 6A and 6B illustrate a flow diagram of an example method for providing a hybrid fixed focus during operation of an indicia reader according to the techniques described herein.
Figure 6B:
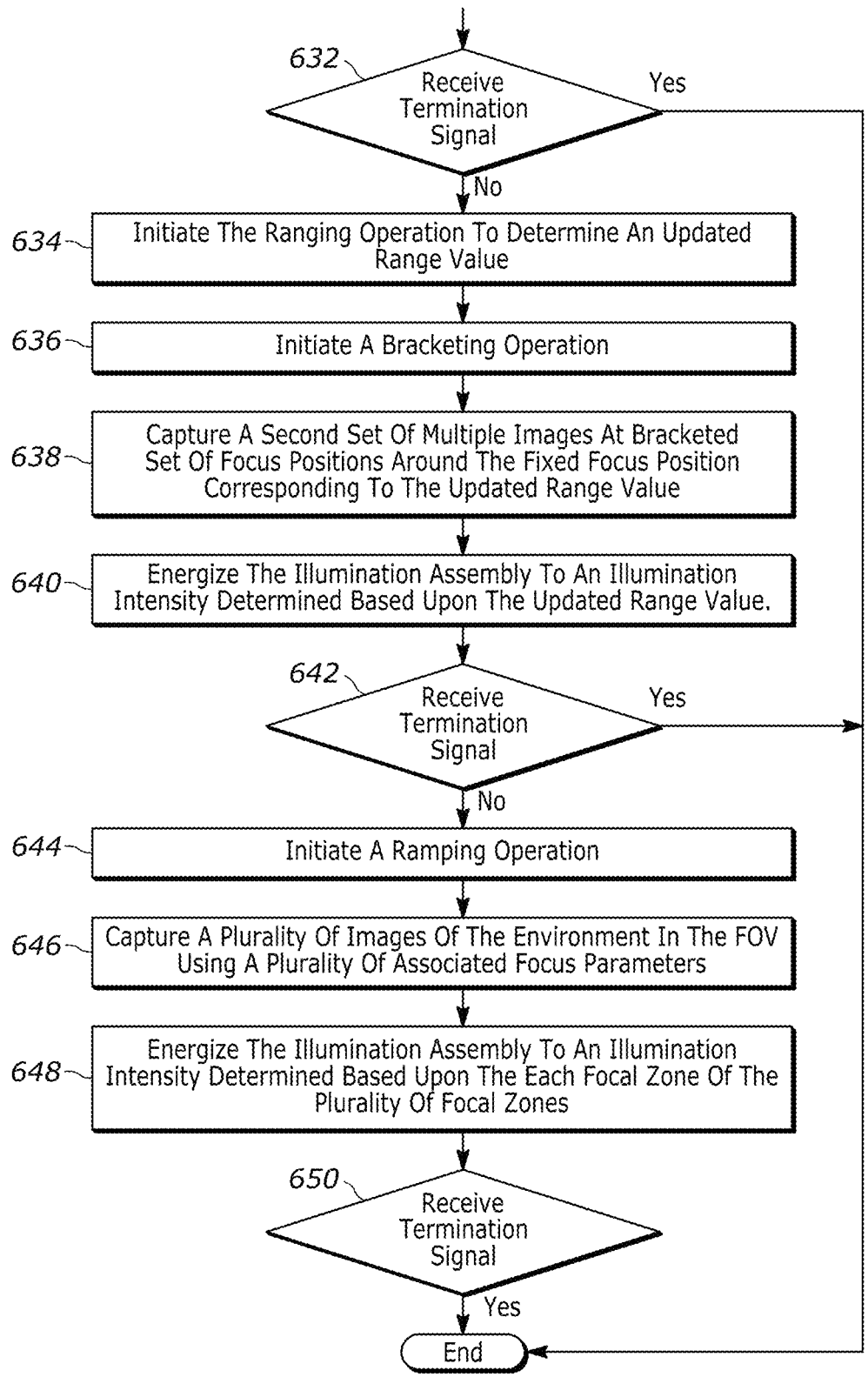

Referring next to FIGS. 6A and 6B, the method 600 illustrates a flow diagram of an example method for providing for providing a hybrid fixed focus during operation of an indicia reader comprising, such as indicia reader 100. Although the method 600 is described below with regard to a controller such as controller 258, an imaging assembly such as imaging assembly 245, and components of light sources (e.g., aiming light source 223, illumination assembly including the illumination light source 251 and the illumination lens 252, etc.), it will be understood that other similarly suitable imaging devices and/or components may be used instead (e.g., imaging device 200, 490, etc.).

The method 600 includes at block 610 initiating a ranging operation of an imaging assembly having a FOV. In some implementation, initiating the ranging operation 610 may be responsive to receiving a command (e.g., signal, instructions, etc.) from a controller, such as controller 258. For example, a user may engage the trigger of an indicia reader, such as trigger 110 of indicia reader 100, and as a result the controller generates a command to initiate the ranging operation 610. In some implementations, initiating the ranging operation 610 may be responsive to an object (e.g., an item with an indicia for decoding, a user of the indicia reader, etc.) entering a FOV of the imaging assembly such as imaging assembly 245, receiving an input from a user via user interface of the indicia reader, or any other suitable means of initiating the ranging operation 610.

The ranging operation of the method 600 may include at block 612 energizing an aiming light source such as aiming LED 223. The aiming light source may be configured to project an aiming light into the FOV of the imaging assembly. At block 614, the method 600 may further include capturing, by the imaging assembly, one or more images comprising image data of the FOV containing the aiming light.

At block 616, based upon the ranging operation, the method 600 may include determining a range value associated with a distance between the imaging assembly and an object in the FOV. For example, the aiming light source may project an aiming pattern into the imaging assembly's FOV, as described with respect to FIGS. 3A and 3B, to determine (e.g., via the controller, the imaging processor or other suitable device and/or component) the distance between the object and the indicia reader, as well as determining a range value. In at least some embodiments, the method 600 may include at block 618 storing the range value locally on a memory, such as memory 260, associated with the imaging assembly. In at least some embodiments, the method 600 may include at block 620 retrieving a last known range value locally from the memory associated with the imaging assembly, such as when the ranging operation fails to generate a distance and/or range value, etc., as previously described.

The method 600 may include at block 622 retrieving a threshold range value locally from a memory associated with the imaging assembly, and at block 624 comparing the range value to the threshold range value. The block 624 comparison may indication whether the range value exceeds the threshold value, which may indicate the object is at a distance which is further away from the imaging assembly than the distance associated with the threshold range value. In at least some implementations of method 600, the threshold range value is at least one of (i) provided by a user, (ii) generated by a machine learning model, or (iii) based upon historical range values for the object in the field of view.

The method 600 may include at block 626 initiating a hybrid fixed focus operation via the controller. The hybrid fixed focus operation may include at block 628 energizing an illumination assembly to provide illumination of the field of view during the hybrid fixed focus operation. In at least some implementations of the method 600, the illumination assembly includes at least one near field illumination assembly (e.g., a near field LED) and at least one far field illumination assembly (e.g., a far field LED). In at least some implementations of the method 600, energizing the illumination assembly during the hybrid fixed focus operation at block 628 may further include energizing the near field illumination assembly.

The hybrid fixed focus operation of the method 600 may further include at block 630 capturing, by the imaging assembly, a first set of one or more images comprising image data of an environment appearing in the FOV at a fixed focus position, (i) wherein the fixed focus position corresponds to the range value responsive to the range value not exceeding the threshold range value (e.g., indicating the object is at not a distance which is further away from the imaging assembly than the distance associated with the threshold range), and (ii) wherein the fixed focus position corresponds to the threshold range value responsive to the range value exceeding the threshold value (e.g., indicating the object is at a distance which is further away from the imaging assembly than the distance associated with the threshold range).

The method 600 may include terminating the hybrid fixed focus operation based upon the controller at block 632 receiving a termination signal. As previously described, the termination signal may be generated based on the successful decode of an indicia (e.g., by the indicia decoding module), upon a user releasing a trigger of the indicia reader, due to a system timeout, or any other suitable reason. One or more suitable devices and/or components of the indicia reader, one or more suitable devices and/or components operably commented to the indica reader, one or more suitable devices and/or components in communication with the indicia reader, etc., may generate and/or provide the terminal signal to the controller.

In at least some embodiments of the method 600, terminating the hybrid fixed focus operation based upon the controller receiving the termination signal at block 632 may further include (i) providing the image data from at least one image of the first set of one or more images to a decoding module, (ii) analyzing the image data from the at least one image of the one or more images by the decoding module to decode an indicia contained within the at least one image, and (iii) responsive to decoding the indicia contained within the at least one image, receiving the termination signal at block 632.

In at least some embodiments, responsive to not receiving the termination signal at block 632, wherein the termination signal is based upon a successful decode of an indicia contained within at least one image of the first set of images captured during the hybrid fixed focus operation, the method 600 may include at block 634 initiating the ranging operation to determine an updated range value.

In at least some embodiments, the method 600 may include at block 636 initiating a bracketing operation via the controller. The bracketing operation of the method 600 may further include at block 638 capturing, by the imaging assembly, a second set of multiple images comprising image data of the environment appearing in the field of view at a bracketed set of focus positions around the fixed focus position corresponding to the updated range value. The bracketing operation of the method 600 may further include at block 640 energizing the illumination assembly to an illumination intensity determined based upon the updated range value (e.g., as indicated by a LUT such as LUT 350, a calibration table, other structure in memory, etc.).

In at least some embodiments, responsive to not receiving the termination signal at block 642, wherein the termination signal is based upon a successful decode of an indicia contained within at least one image of the first set of images captured during the hybrid fixed focus operation, the method 600 may include at block 644 initiating a ramping operation via the controller. The ramping operation of the method 600 may include at block 646 capturing, by the imaging assembly, a plurality of images comprising image data of the environment appearing in the field of view using an associated plurality of focus parameters defining a plurality of different focal zones, the ramping operation generating image data at each focal zone of the plurality of focal zones. The ramping operation of the method 600 may further include at block 648 energizing the illumination assembly to an illumination intensity determined based upon the each focal zone of the plurality of focal zones.

In at least some embodiments of the ramping operation of method 600, (i) the illumination assembly may include at least one near field illumination assembly and at least one far field illumination assembly, (ii) the plurality of focus parameters may include focus parameters defining a first plurality of focal zones corresponding to at least one near field illumination assembly and a second plurality of focal zones corresponding to the at least one far field illumination assembly, and (iii) the ramping operation may further include generating, by the imaging assembly, image data at each of the plurality of focal zones and/or at each of the second plurality of focal zones.

In at least some embodiments, responsive to receiving the termination signal at block 650, the method 600 may end, i.e., terminating the ramping operation based upon the controller receiving a termination signal at block 650. In at least some embodiments, responsive to not receiving the termination signal at block 650, the method 600 may continue with the ramping operation indefinitely.

It will be understood that the foregoing represents one potential implementation, and that other implementations may be envisioned. For example, in some implementations, a bi-optic barcode scanner may be used as the imaging device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for providing a hybrid fixed focus during operation of an indicia reader comprising:
   initiating a ranging operation of an imaging assembly having a field of view;
   based upon the ranging operation, determining a range value associated with a distance between the imaging assembly and an object in the field of view;
   retrieving a threshold range value locally from a memory associated with the imaging assembly;
   comparing the range value to the threshold range value;
   initiating a hybrid fixed focus operation via a controller, the hybrid fixed focus operation comprising:
      energizing an illumination assembly to provide illumination of the field of view during the hybrid fixed focus operation; and capturing, by the imaging assembly, a first set of one or more images comprising image data of an environment appearing in the field of view at a fixed focus position,
   wherein the fixed focus position corresponds to the range value responsive to the range value not exceeding the threshold range value, and wherein the fixed focus position corresponds to the threshold range value responsive to the range value exceeding the threshold value; and
terminating the hybrid fixed focus operation based upon the controller receiving a termination signal,
wherein the threshold range value is at least one of provided by a user, generated by a machine learning model, or based upon historical range values for the object in the field of view.

2. The method of claim 1, further comprising:
responsive to not receiving the termination signal, wherein the termination signal is based upon a successful decode of an indicia contained within at least one image of the first set of images captured during the hybrid fixed focus operation, initiating the ranging operation to determine an updated range value; and
initiating a bracketing operation via the controller, the bracketing operation comprising:
   capturing, by the imaging assembly, a second set of multiple images comprising image data of the environment appearing in the field of view at a bracketed set of focus positions around the fixed focus position corresponding to the updated range value; and
   energizing the illumination assembly to an illumination intensity determined based upon the updated range value.

3. The method of claim 2, further comprising:
responsive to not receiving the termination signal, wherein the termination signal is based upon the successful decode of the indicia contained within at least one image of the second set of multiple images captured during the bracketing operation, initiating a ramping operation via the controller, the ramping operation comprising:
   capturing, by the imaging assembly, a plurality of images comprising image data of the environment appearing in the field of view using an associated plurality of focus parameters defining a plurality of different focal zones, the ramping operation generating image data at each focal zone of the plurality of focal zones; and
   energizing the illumination assembly to an illumination intensity determined based upon the each focal zone of the plurality of focal zones.

4. The method of claim 1, wherein the ranging operation comprises:
energizing an aiming light source configured to project an aiming light into the field of view;
capturing, by the imaging assembly, one or more images comprising image data of the field of view containing the aiming light;
analyzing a position of the aiming light in the one or more images to determine the range value; and
storing the range value locally on a memory associated with the imaging assembly.

5. The method of claim 1, wherein the ranging operation comprises:
retrieving a last known range value locally from the memory associated with the imaging assembly.

6. The method of claim 1, wherein the illumination assembly includes at least one near field illumination assembly and at least one far field illumination assembly.

7. The method of claim 6, wherein energizing the illumination assembly during the hybrid fixed focus operation includes energizing the near field illumination assembly.

8. The method of claim 3, wherein:
the illumination assembly includes at least one near field illumination assembly and at least one far field illumination assembly;
the plurality of focus parameters comprise focus parameters defining a first plurality of focal zones corresponding to at least one near field illumination assembly and a second plurality of focal zones corresponding to the at least one far field illumination assembly; and
the ramping operation further comprises generating, by the imaging assembly, image data at each of the plurality of focal zones and/or at each of the second plurality of focal zones.

9. The method of claim 1, wherein terminating the hybrid fixed focus operation based upon the controller receiving the termination signal further comprises:
providing the image data from at least one image of the first set of one or more images to a decoding module;
analyzing the image data from the at least one image of the one or more images by the decoding module to decode an indicia contained within the at least one image; and
responsive to decoding the indicia contained within the at least one image, receiving the termination signal.

10. A system for providing a hybrid fixed focus during operation of an indicia reader comprising:
an imaging assembly having a field of view;
a controller;
one or more processors; and
a memory associated with the indicia reader scanner storing instructions that, when executed by the one or more processors, cause the one or more processors to:
initiate a ranging operation of the imaging assembly;
based upon the ranging operation, determine a range value associated with a distance between the imaging assembly and an object in the field of view;
retrieve a threshold range value locally from a memory associated with the imaging assembly;
compare the range value to the threshold range value;
initiate a hybrid fixed focus operation via the controller, wherein the hybrid fixed focus operation comprises the one or more processors configured to:
   energize an illumination assembly to provide illumination of the field of view during the hybrid fixed focus operation; and
   capture, by the imaging assembly, a first set of one or more images comprising image data of an environment appearing in the field of view at a fixed focus position,
     wherein the fixed focus position corresponds to the range value responsive to the range value not exceeding the threshold range value, and wherein the fixed focus position corresponds to the threshold range value responsive to the range value exceeding the threshold value; and
terminate the hybrid fixed focus operation based upon the controller receiving a termination signal,
wherein to energize the illumination assembly during the hybrid fixed focus operation, the one or more processors are further configured to energize a near field illumination assembly of the illumination assembly.

11. The system of claim 10, further comprising the one or more processors configured to:
responsive to not receiving the termination signal, wherein the termination signal is based upon a successful decode of an indicia contained within at least one image of the first set of images captured during the hybrid fixed focus operation, initiate the ranging operation to determine an updated range value; and
initiate a bracketing operation via the controller, wherein the bracketing operation comprises the one or more processors configured to:
capture, by the imaging assembly, a second set of multiple images comprising image data of the environment appearing in the field of view at a bracketed set of focus positions around the fixed focus position corresponding to the range value; and
energize the illumination assembly to an illumination intensity determined based upon the updated range value.

12. The system of claim 11, further comprising the one or more processors configured to:
responsive to not receiving the termination signal, wherein the termination signal is based upon a successful decode of an indicia contained within at least one image of the second set of multiple images captured during the bracketing operation, initiate a ramping operation, wherein the ramping operation comprises the one or more processors configured to:
capture, by the imaging assembly, a plurality of images comprising image data of the environment appearing in the field of view using an associated plurality of focus parameters defining a plurality of different focal zones, the ramping operation generating image data at each focal zone of the plurality of focal zones; and
energize the illumination assembly to an illumination intensity determined based upon the each focal zone of the plurality of focal zones.

13. The system of claim 10, wherein the ranging operation comprises the one or more processors configured to:
energize an aiming light source configured to project an aiming light into the field of view;
capture, by the imaging assembly, one or more images comprising image data of the field of view containing the aiming light;
analyze a position of the aiming light in the one or more images to determine the range value; and
store the range value locally on a memory associated with the imaging assembly.

14. The system of claim 10, wherein the ranging operation comprises the one or more processors configured to:
retrieving a last known range value locally from the memory associated with the imaging assembly.

15. The system of claim 12, wherein:
the illumination assembly includes at least one near field illumination assembly and at least one far field illumination assembly; and
the plurality of focus parameters comprise focus parameters defining a first plurality of focal zones corresponding to at least one near field illumination assembly and a second plurality of focal zones corresponding to the at least one far field illumination assembly, the ramping operation generating image data at each of the plurality of focal zones and/or at each of the second plurality of focal zones.

16. The system of claim 10, wherein to terminate the hybrid fixed focus operation based upon the controller receiving the termination signal comprises the one or more processors further configured to:
provide the image data from at least one image of the first set of one or more images to a decoding module;
analyze the image data from the at least one image of the one or more images by the decoding module to decode an indicia contained within the at least one image; and
responsive to decoding the indicia contained within the at least one image, receive the termination signal.

17. The system of claim 10, wherein the threshold range value is at least one of provided by a user, generated by a machine learning model, or based upon historical range values for the object in the field of view.

18. A tangible machine-readable medium comprising instructions that, when executed, cause a machine to at least:
initiate a ranging operation of an imaging assembly having a field of view;
based upon the ranging operation, determine a range value associated with a distance between the imaging assembly and an object in the field of view;
retrieve a threshold range value locally from a memory associated with the imaging assembly;
compare the range value to the threshold range value;
initiate a hybrid fixed focus operation via a controller, wherein the hybrid fixed focus operation further comprises instructions that, when executed, cause the machine to:
energize an illumination assembly to provide illumination of the field of view during the hybrid fixed focus operation; and
capture a first set of one or more images comprising image data of an environment appearing in the field of view at a fixed focus position by the imaging assembly,
wherein the fixed focus position corresponds to the range value responsive to the range value not exceeding the threshold range value, and wherein the fixed focus position corresponds to the threshold range value responsive to the range value exceeding the threshold value; and
terminate the hybrid fixed focus operation based upon the controller receiving a termination signal,
wherein the threshold range value is at least one of provided by a user, generated by a machine learning model, or based upon historical range values for the object in the field of view.

* * * * *